(12) United States Patent
Nishimura

(10) Patent No.: US 7,428,107 B2
(45) Date of Patent: Sep. 23, 2008

(54) ZOOM LENS AND IMAGE PICKUP APPARATUS HAVING THE SAME

(75) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/959,223

(22) Filed: Dec. 18, 2007

(65) Prior Publication Data

US 2008/0151392 A1    Jun. 26, 2008

(30) Foreign Application Priority Data

Dec. 20, 2006    (JP) .............................. 2006-342587

(51) Int. Cl.
G02B 15/14    (2006.01)
(52) U.S. Cl. .................. 359/683; 359/684; 359/685; 359/686; 359/715; 359/740; 359/766; 359/554
(58) Field of Classification Search ................. 359/676, 359/683–686, 715, 740, 766, 554
See application file for complete search history.

(56) References Cited

U.S. PATENT DOCUMENTS

| | | | |
|---|---|---|---|
| 6,025,962 A | 2/2000 | Suzuki | |
| 6,618,197 B1 * | 9/2003 | Hayakawa | 359/557 |
| 7,196,853 B2 | 3/2007 | Nishio | |
| 2006/0203356 A1 * | 9/2006 | Fujimoto et al. | 359/685 |
| 2006/0221460 A1 * | 10/2006 | Saruwatari | 359/676 |

FOREIGN PATENT DOCUMENTS

JP    2004-226644    8/2004

* cited by examiner

*Primary Examiner*—Evelyn A. Lester
(74) *Attorney, Agent, or Firm*—Canon USA Inc I.P. Div

(57) ABSTRACT

A zoom lens includes first to fifth lens units arranged in sequence from an object side to an image side, and having positive, negative, positive, negative, and positive refractive powers in that order. The zoom lens performs zooming by moving the first to fifth lens units. The fourth lens unit includes a negative lens, which is moved in such a manner as to have a component in a direction orthogonal to an optical axis so as to shift an image formed with an entire system in the direction orthogonal to the optical axis. The zoom lens satisfies the condition, $$0.50 < |ft/f4| < 1.50,$$

where ft is a focal length of the entire system, and f4 is a focal length of the fourth lens unit, both at the telephoto end.

12 Claims, 26 Drawing Sheets

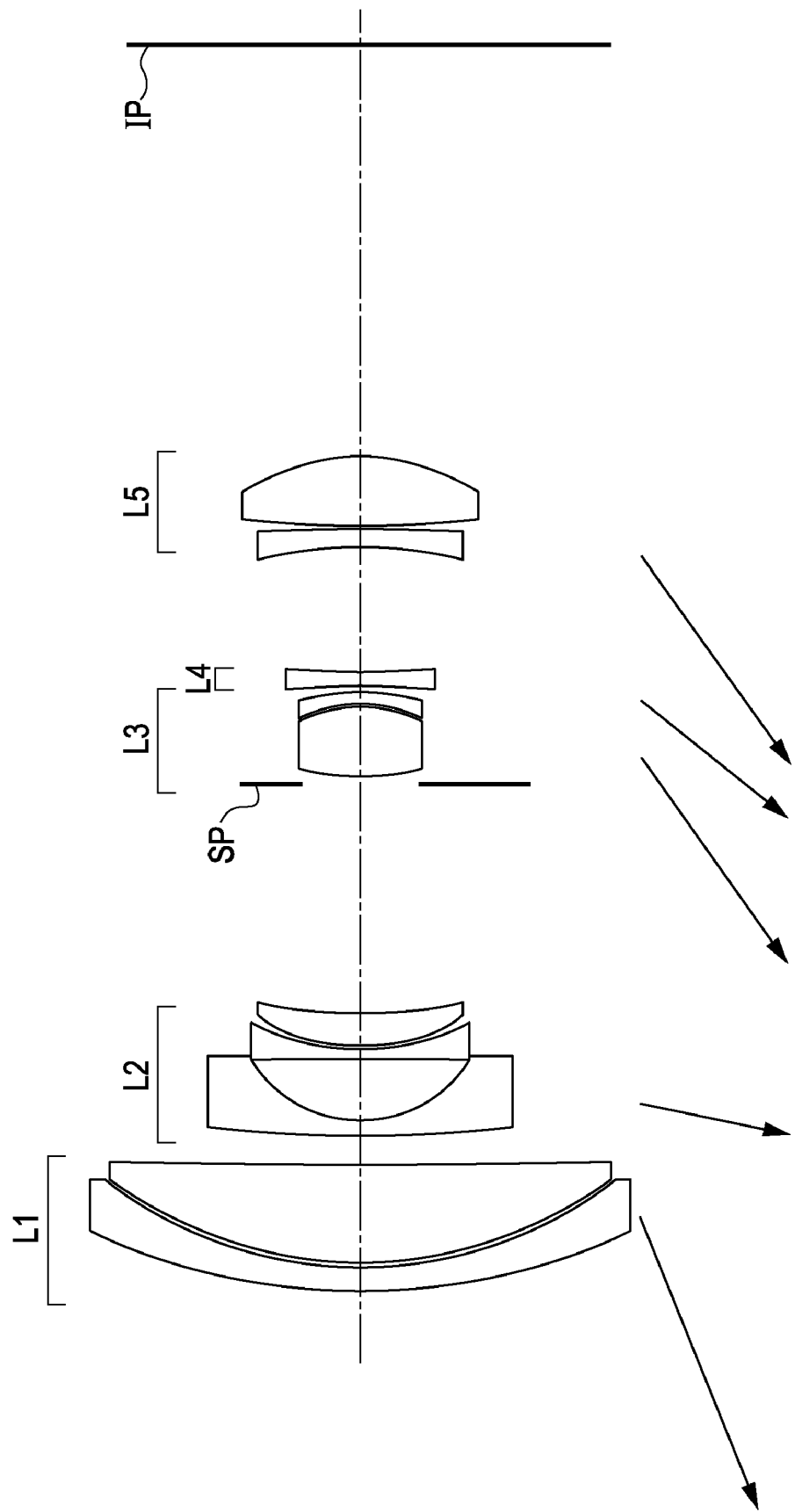

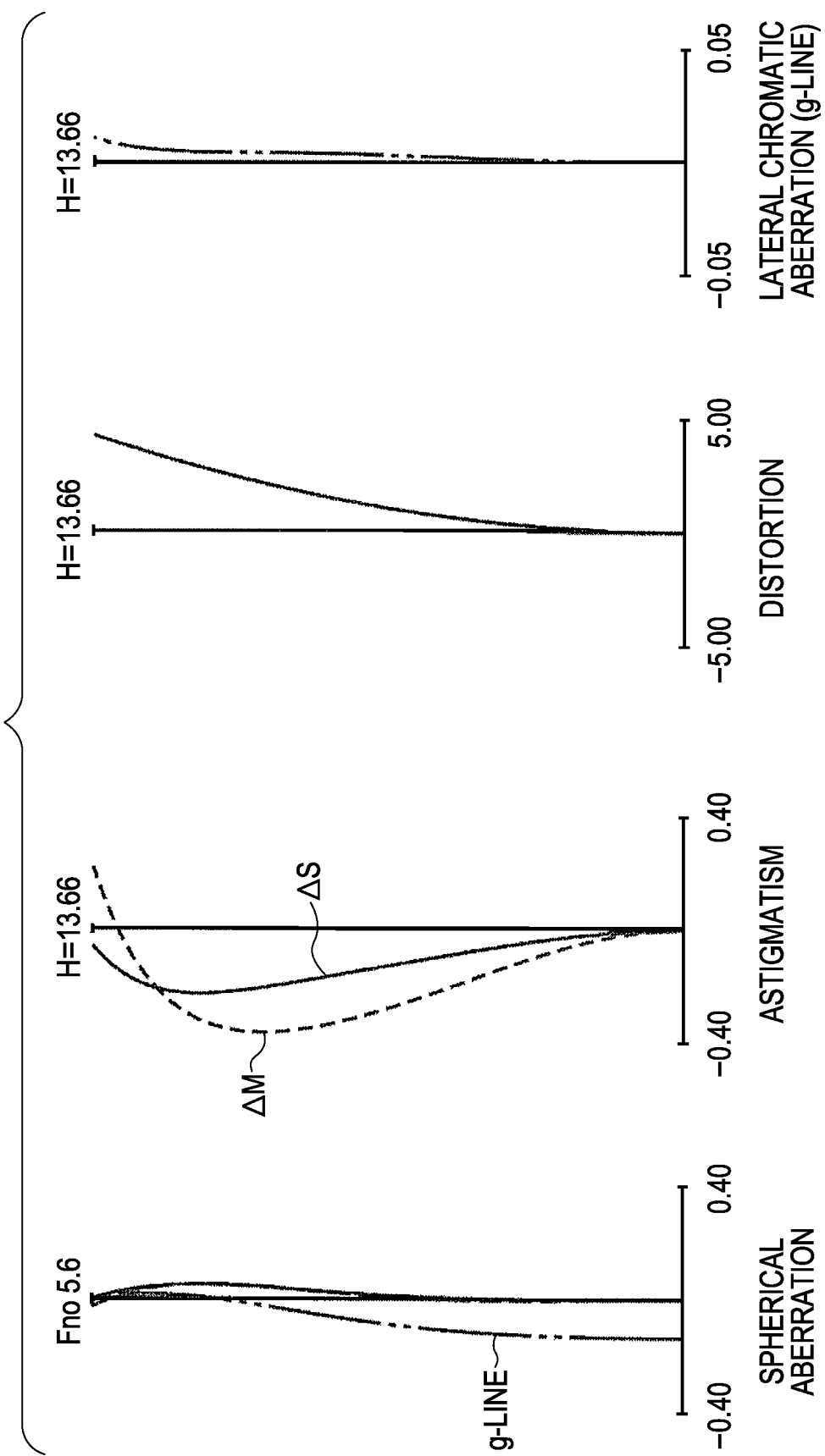

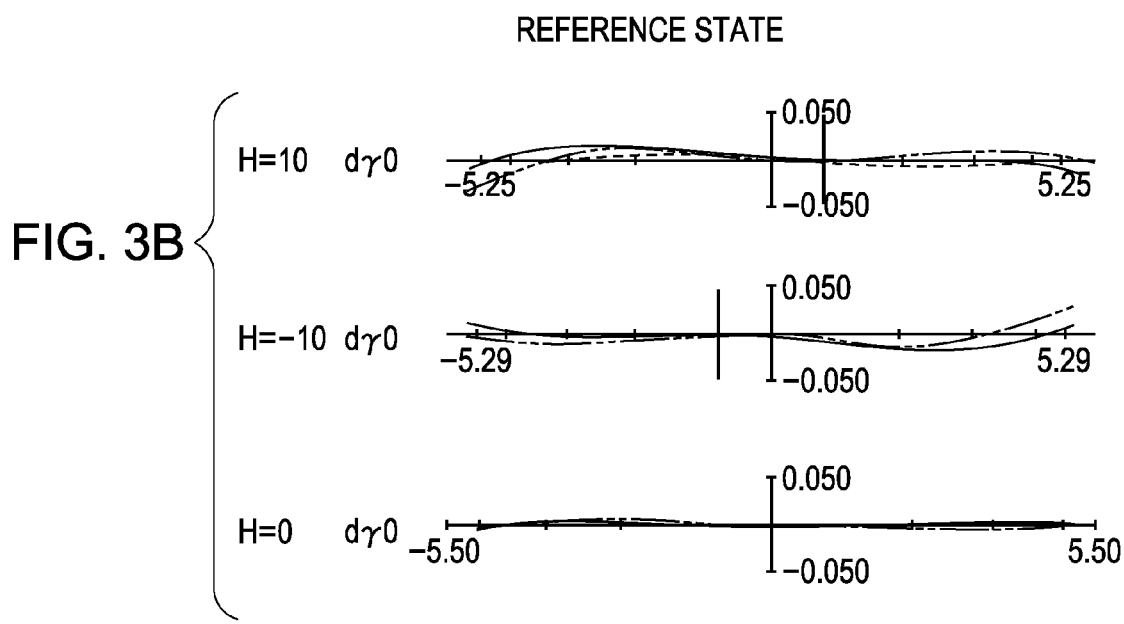
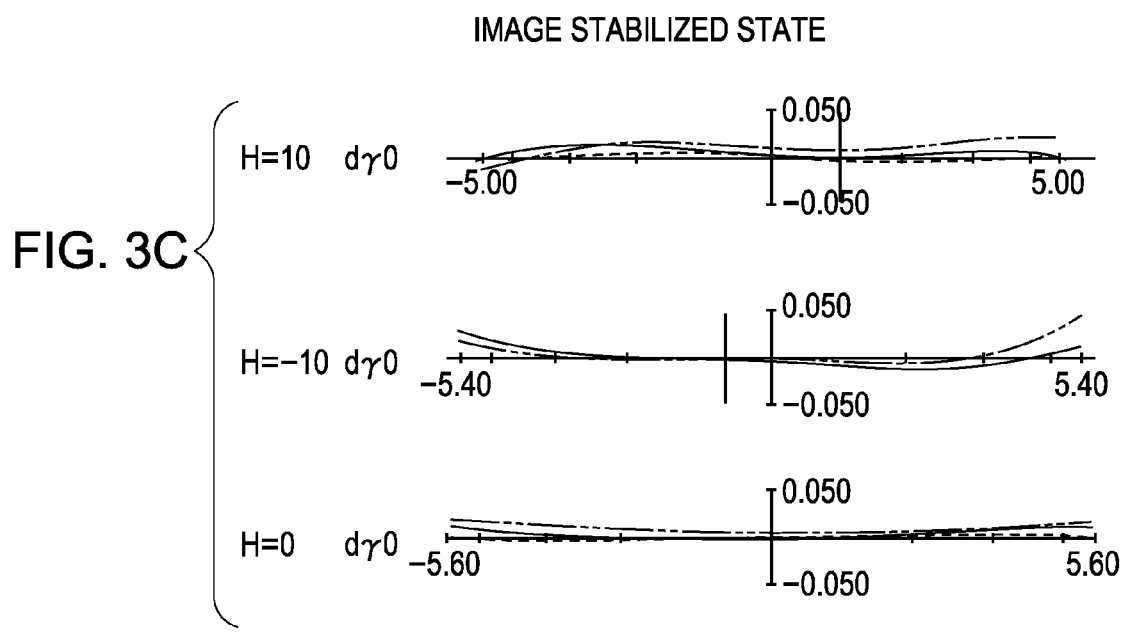

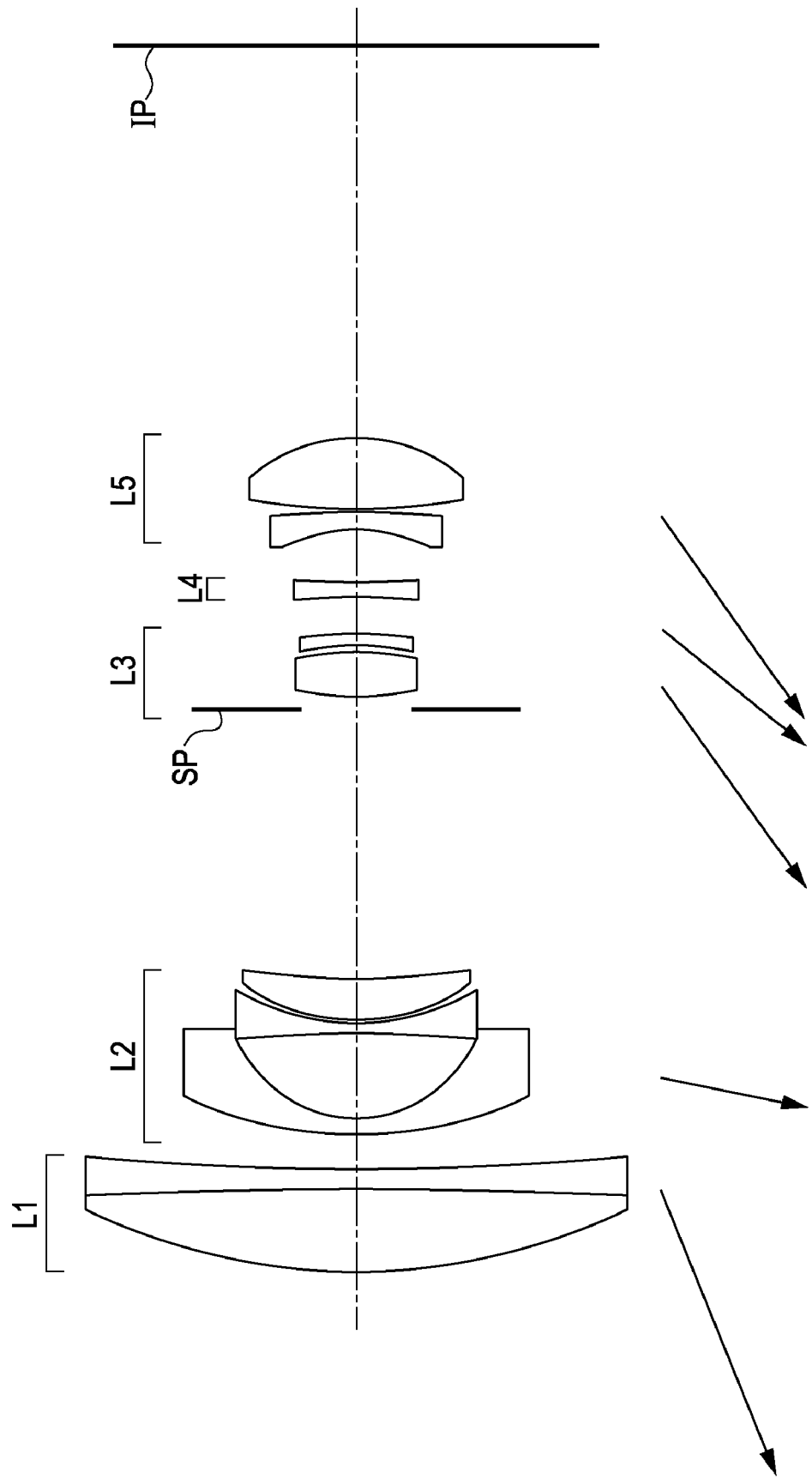

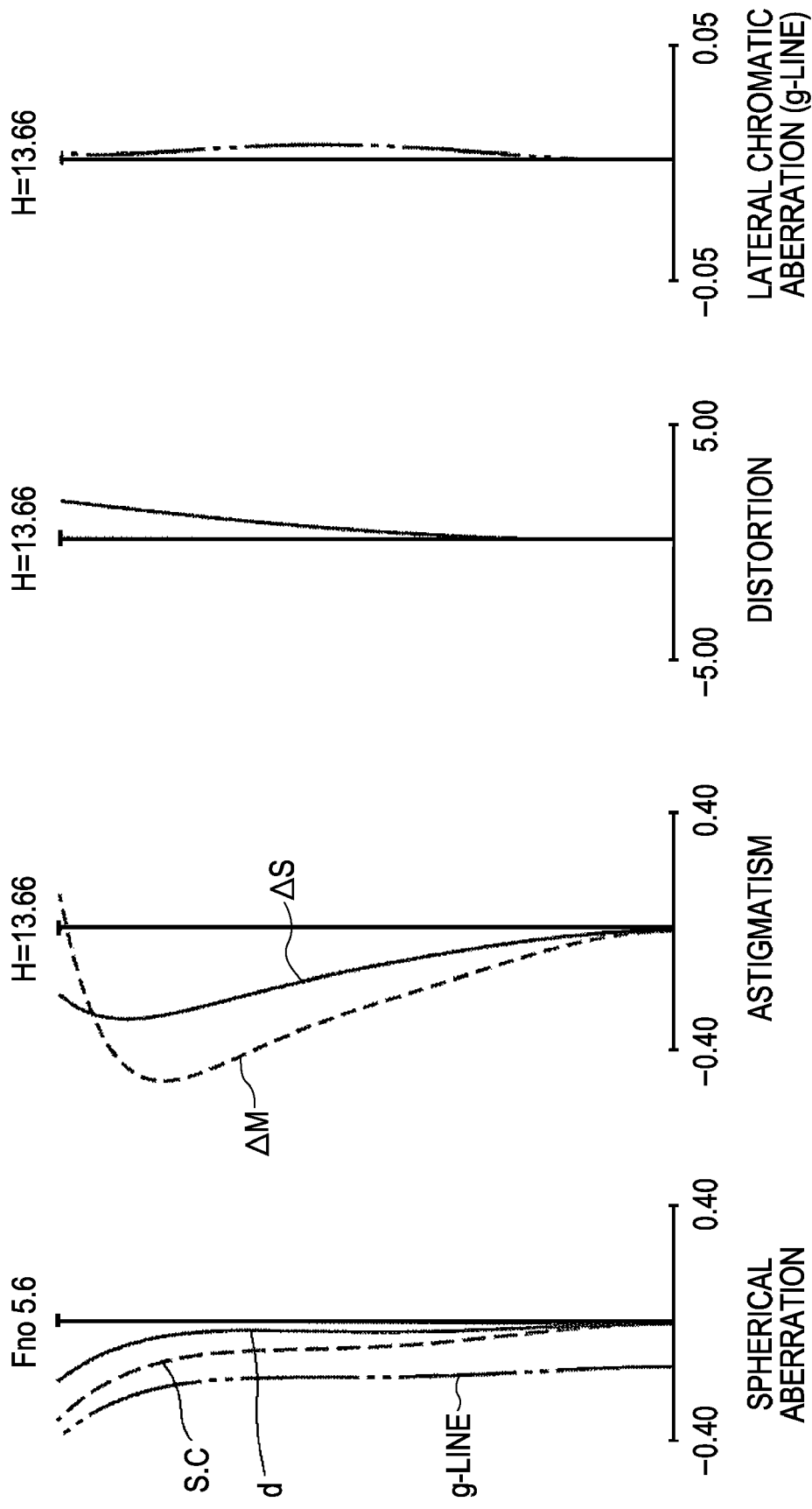

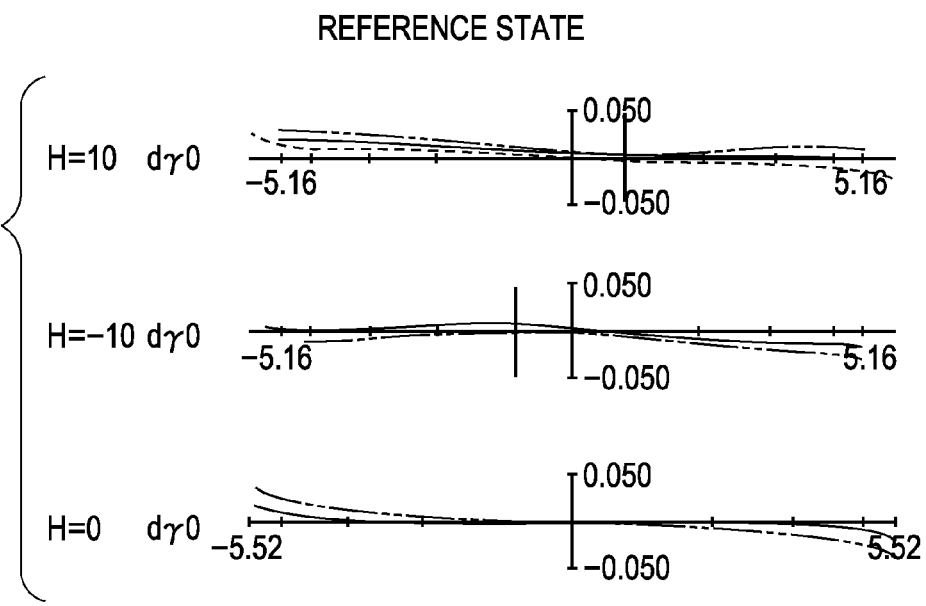
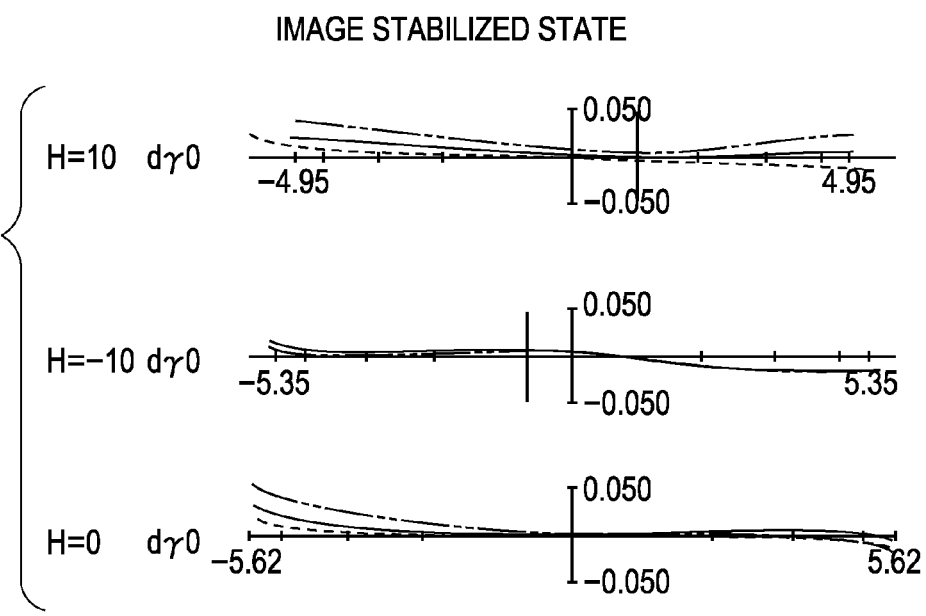

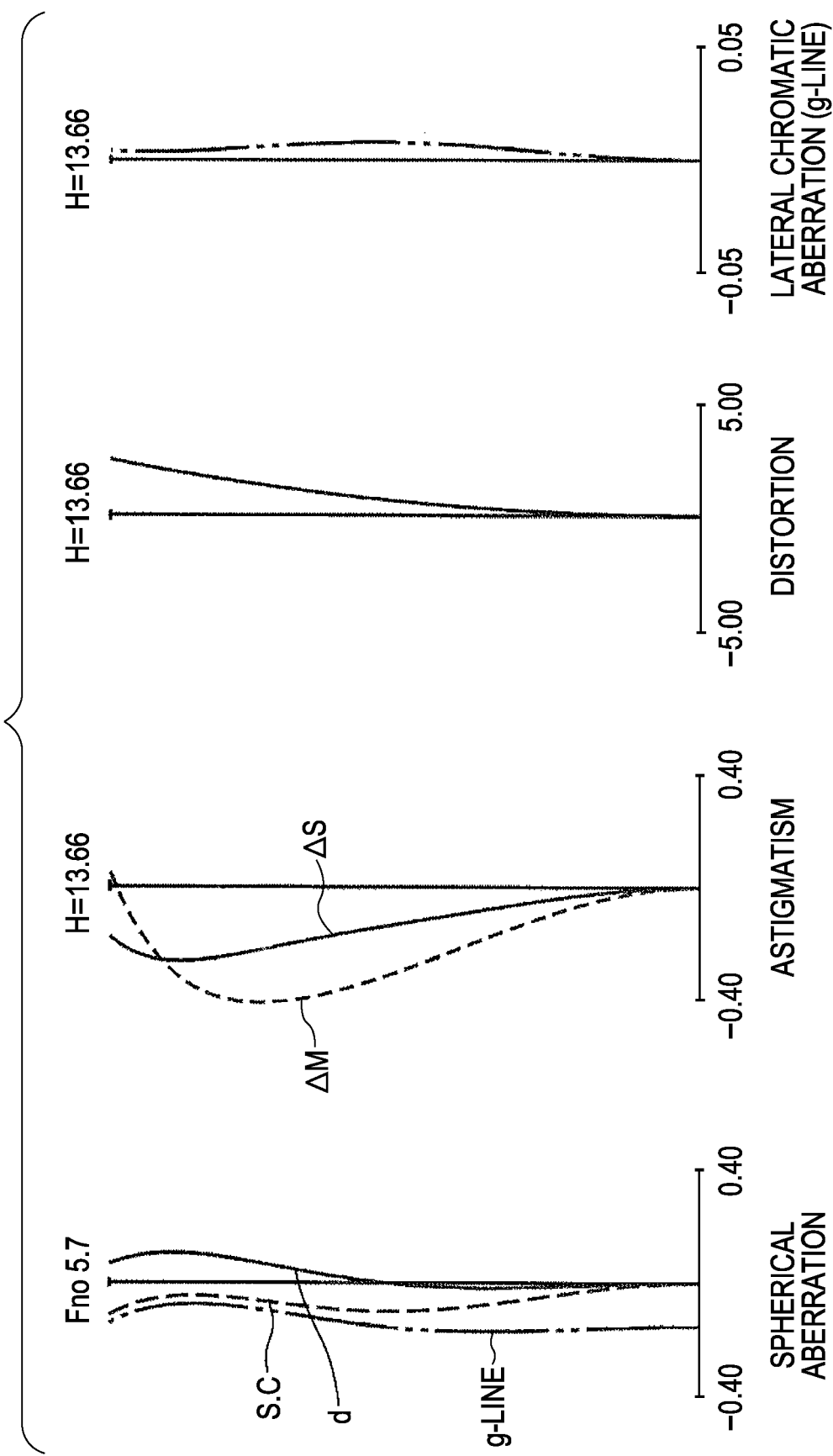

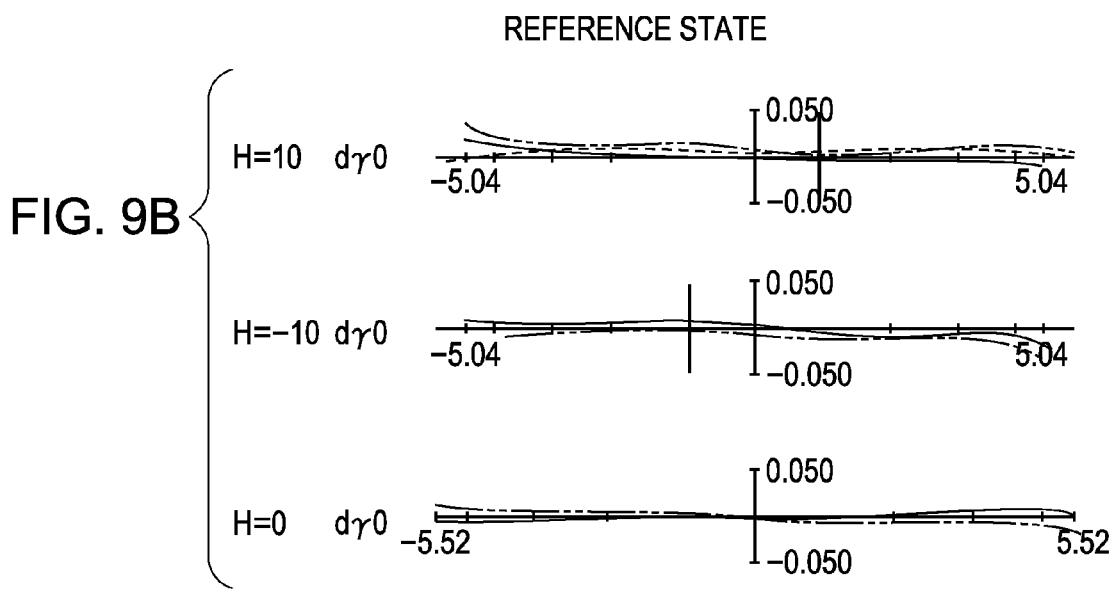
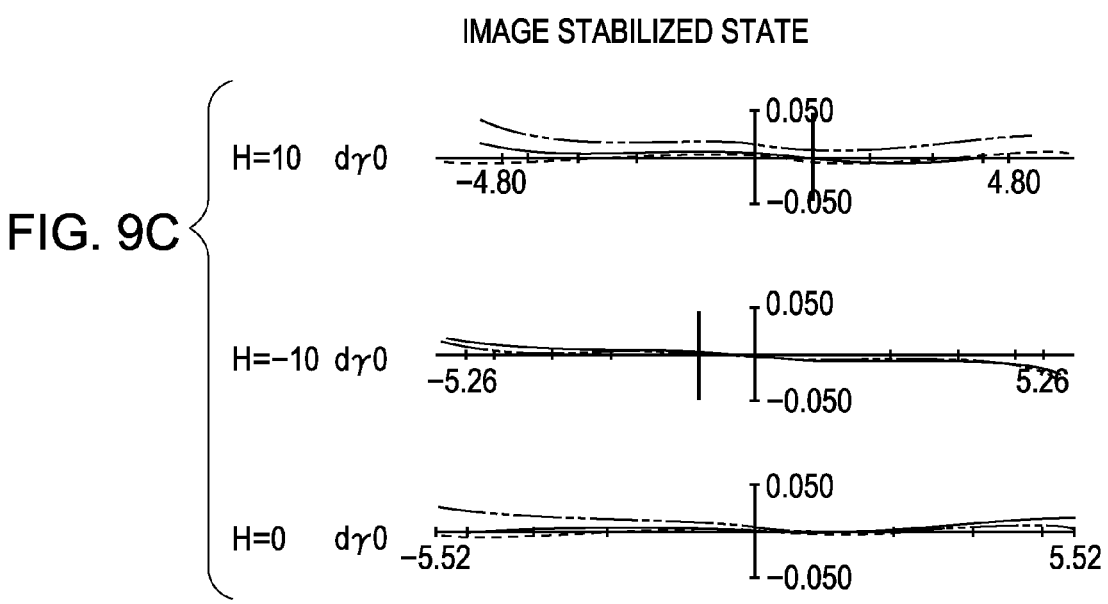

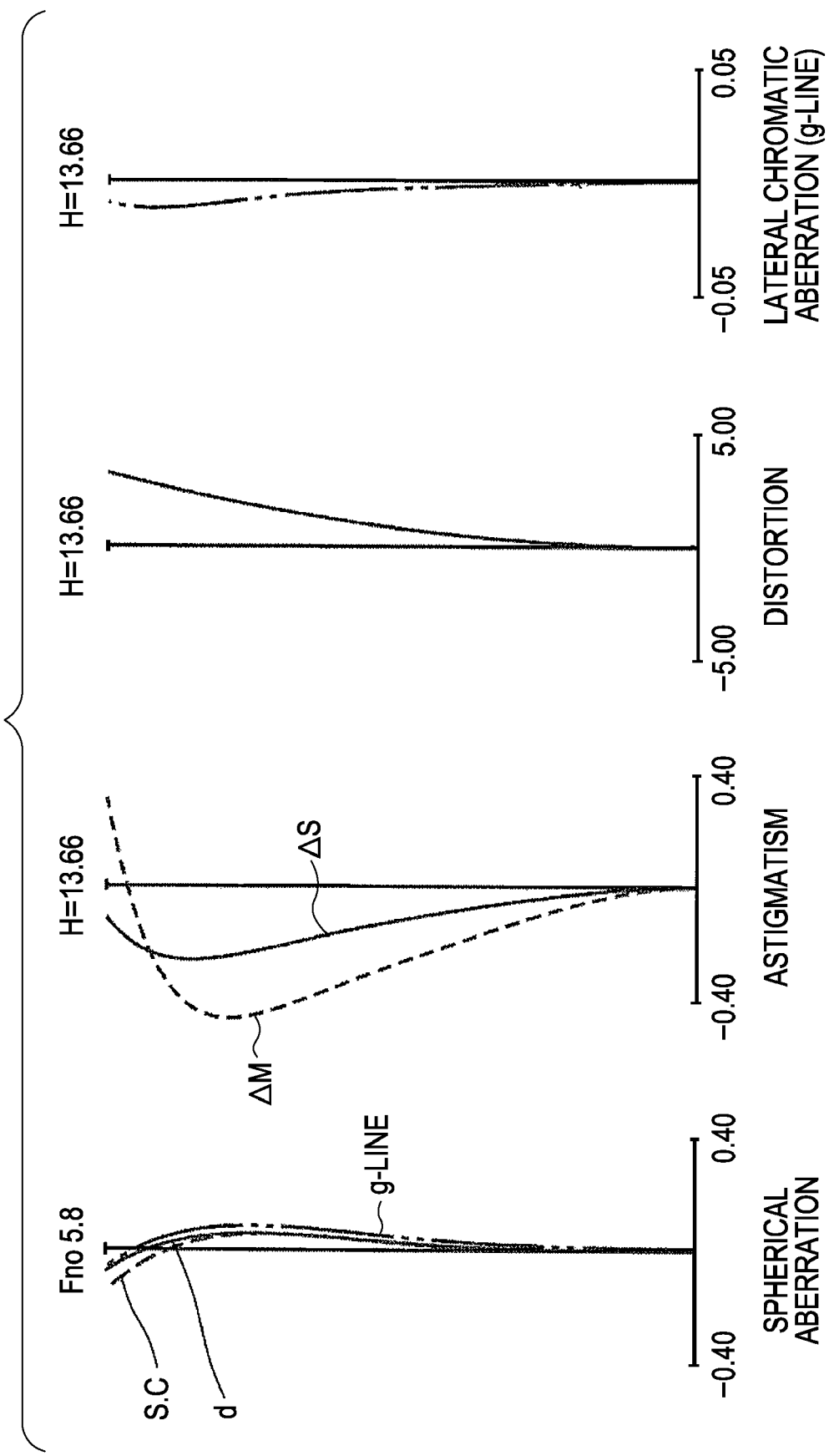

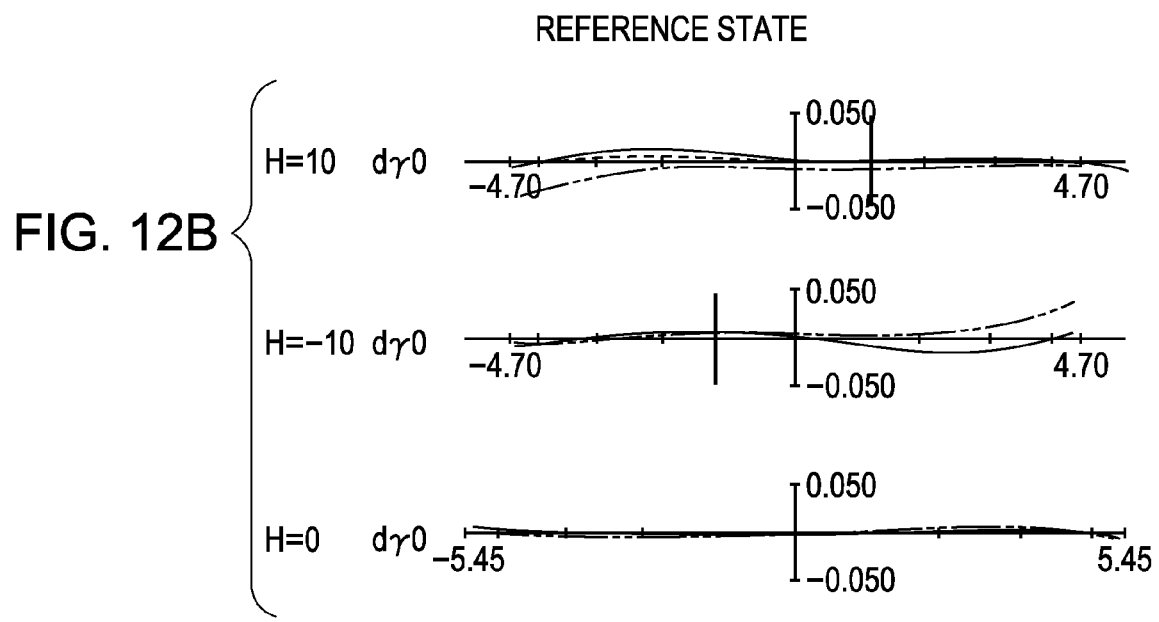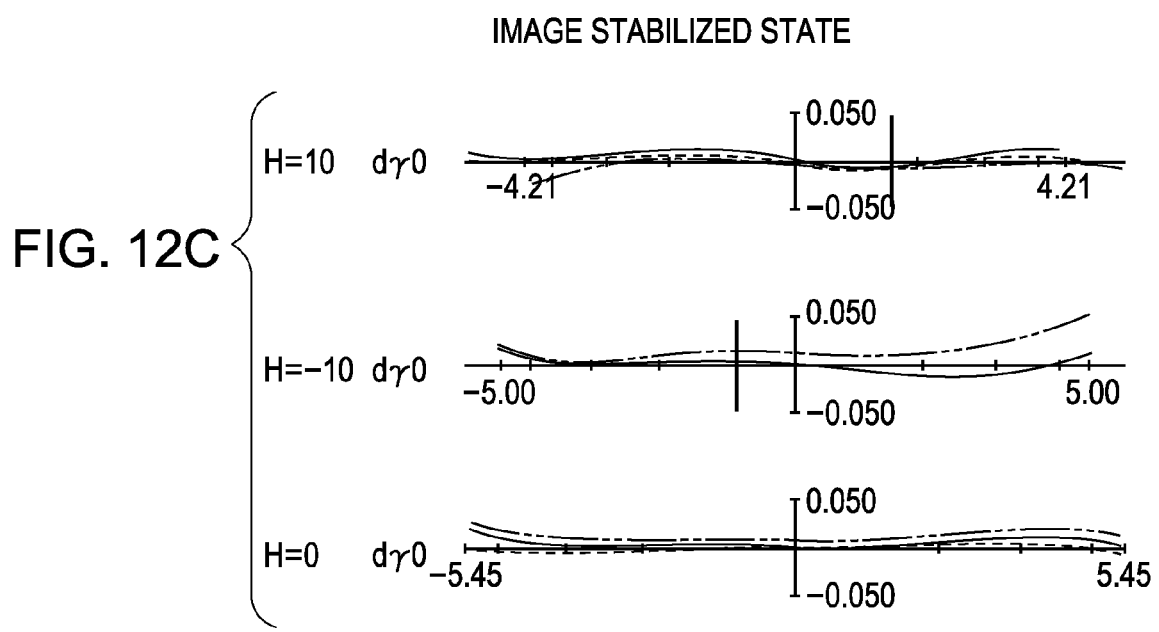

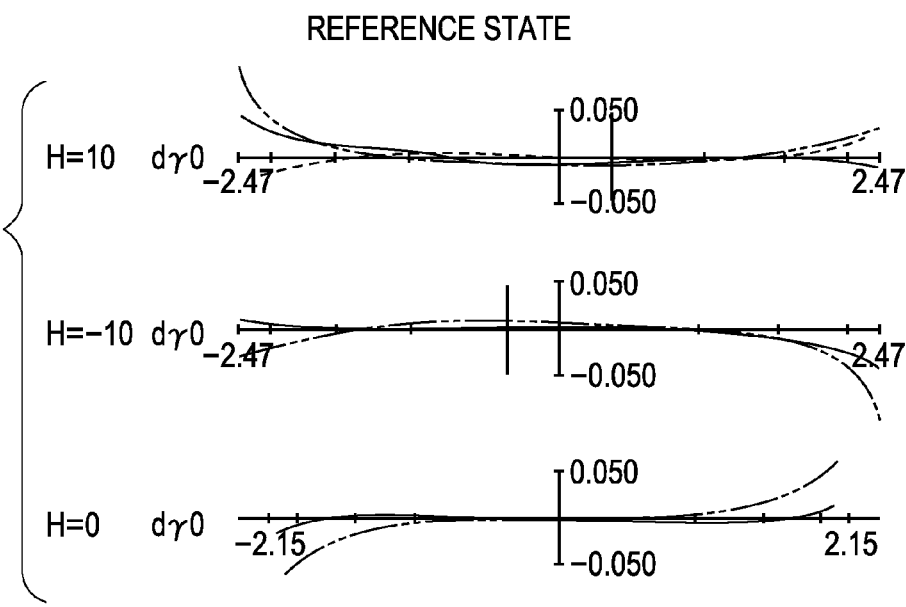
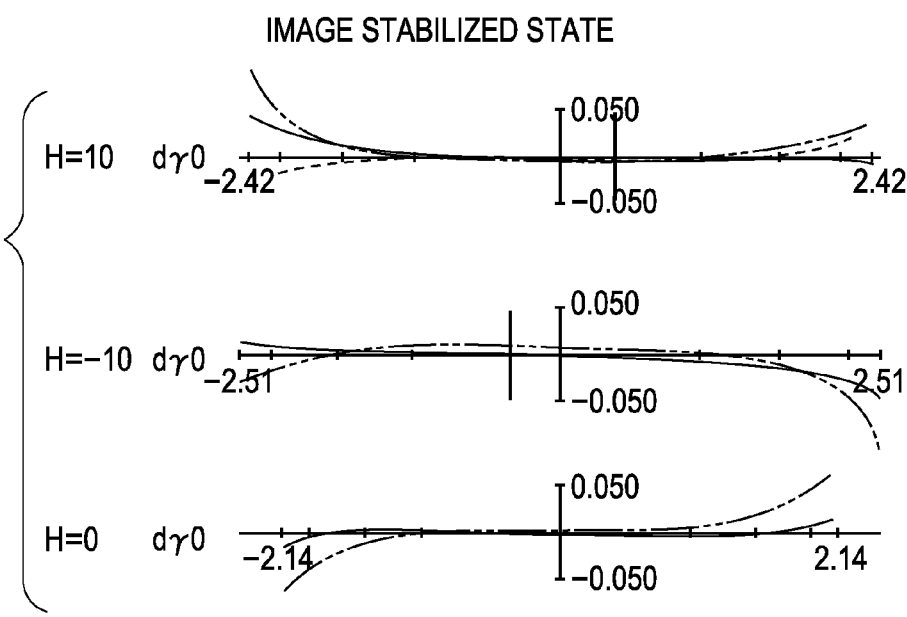

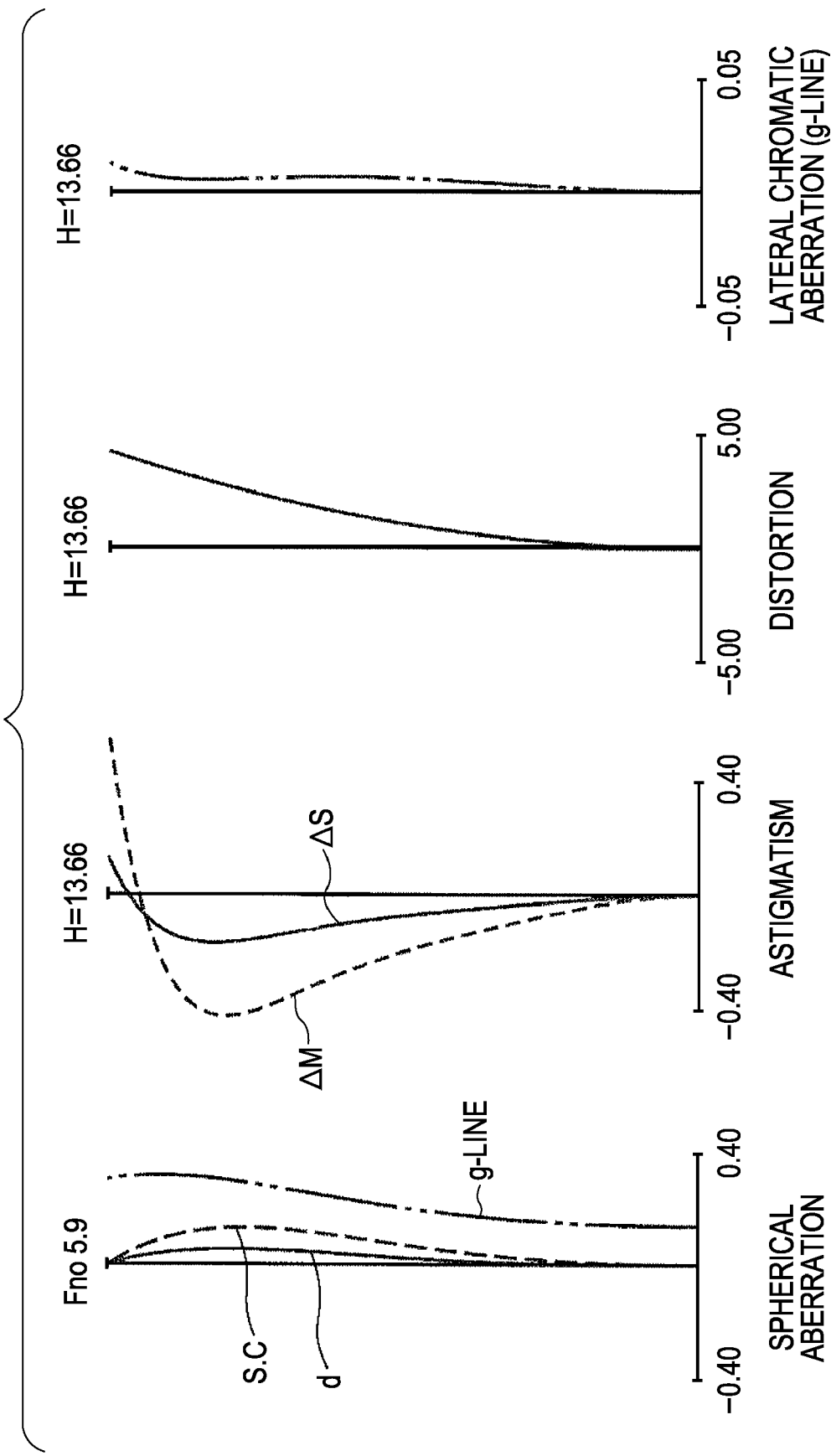

ZOOM LENS AND IMAGE PICKUP APPARATUS HAVING THE SAME

BACKGROUND OF THE INVENTION

1. Field of the Invention

The present invention relates to zoom lenses which are suitable for photographing optical systems of, for example, film cameras, video cameras, and digital still cameras.

2. Description of the Related Art

A positive-lead zoom lens in which a lens unit with a positive refractive power is disposed at a position closest to the object side has been known as an example of a zoom lens with a relatively long back focus (distance between the last surface of lenses at an object point at infinity and a paraxial image plane), and a high zoom ratio. The long back focus involves a length capable of substantially arranging a quick return mirror in a single reflex camera. Also, the high zoom ratio is a zoom ratio of 3 or higher.

When an unintentional vibration is transmitted to a zoom lens, for example, because of a camera shake due to motion of hands, an image blur may appear in a shot image. To prevent this, a zoom lens has been suggested that has a mechanism (image stabilizing mechanism) for compensating an image blur due to the unintentional vibration, to increase the quality of an image.

An example positive-lead zoom lens has a five-unit zoom lens composed of five lens units with positive, negative, positive, negative, and positive refractive powers in sequence from the object side.

Such a five-unit zoom lens performs image-blur correction (image stabilization) by moving the whole fourth lens unit or a part of the lens units in a direction orthogonal to the optical axis. (For example, see U.S. Pat. Nos. 7,196,853 and 6,025,962, and Japanese Patent Laid-Open No. 2004-226644.)

The above-listed documents discuss a zoom lens including a fourth lens unit composed of two positive and negative lens components. Either or both the lens components are moved in the direction orthogonal to the optical axis to correct an image blur.

A zoom lens for a digital single reflex camera is being desired to have a high zoom ratio and provide a shot image with a high quality. Also, such a zoom lens is being desired to have a predetermined length of a back focus.

In the zoom lens, as the lens units have greater refractive powers, the amounts of movement of the lens units to provide a predetermined zoom ratio are generally reduced, and hence, the total length of lenses can be reduced and the zoom ratio can be increased easily.

However, zooming (varying magnification) with this arrangement may cause large fluctuation in aberrations. Thus, it is difficult to obtain a proper optical performance over the entire zooming range.

Also, when the sufficient length of the back focus is provided while the zoom ratio is increased, the entire lens system at an wide-angle end may define a retrofocus lens system, causing aberrations to increase at the wide-angle end.

An example zoom lens includes a lens unit serving as an image stabilizing lens unit, so that the lens unit is shifted in a direction orthogonal to the optical axis to correct an image blur. Such a zoom lens can correct an image blur relatively easily.

However, image stabilization is not performed quickly unless the lens arrangement of the zoom lens as well as the lens arrangement of the image stabilizing lens unit moved for image stabilization are proper. Decentration aberration may occur during image stabilization, and the optical performance may be degraded.

In particular, it is difficult to quickly perform image stabilization if the image stabilizing lens unit is large and heavy. The slow-speed image stabilization may cause a failure of shooting an object that moves fast.

SUMMARY OF THE INVENTION

The present invention provides a zoom lens having a high zoom ratio, a predetermined length of a back focus, and a high optical performance over the entire zooming range, and capable of quickly stabilizing an image. The invention also provides an image pickup apparatus having the zoom lens.

A zoom lens according to an aspect of the present invention includes a first lens unit having a positive refractive power, a second lens unit having a negative refractive power, a third lens unit having a positive refractive power, a fourth lens unit having a negative refractive power, and a fifth lens unit having a positive refractive power, the first to fifth lens units being arranged from an object side to an image side in that order. The zoom lens performs zooming by moving the first to fifth lens units from a wide-angle end to a telephoto end such that a distance between the first lens unit and the second lens unit increases, a distance between the second lens unit and the third lens unit decreases, a distance between the third lens unit and the fourth lens unit increases, and a distance between the fourth lens unit and the fifth lens unit decreases. The fourth lens unit includes a negative lens, which is moved in such a manner so as to have a component in a direction orthogonal to an optical axis so as to shift an image formed with an entire system in the direction orthogonal to the optical axis. The zoom lens satisfies the following condition:

$$0.50 < |ft/f4| < 1.50,$$

where ft is a focal length of the entire system, and f4 is a focal length of the fourth lens unit, both at the telephoto end.

Further features of the present invention will become apparent from the following description of exemplary embodiments with reference to the attached drawings.

BRIEF DESCRIPTION OF THE DRAWINGS

FIG. 1 is a cross-sectional view of a zoom lens at a wide-angle end according to a first embodiment of the present invention.

FIGS. 3A to 3C illustrate aberration diagrams at a telephoto end according to the first embodiment of the present invention.

FIG. 4 is a cross-sectional view of a zoom lens at a wide-angle end according to a second embodiment of the present invention.

FIGS. 6A to 6C illustrate aberration diagrams at a telephoto end according to the second embodiment of the present invention.

FIGS. 9A to 9C illustrate aberration diagrams at a telephoto end according to the third embodiment of the present invention.

FIGS. 12A to 12C illustrate aberration diagrams at a telephoto end according to the fourth embodiment of the present invention.

FIGS. 14A to 14C illustrate aberration diagrams at the wide-angle end according to the fifth embodiment of the present invention.

FIGS. 15A to 15C illustrate aberration diagrams at a telephoto end according to the fifth embodiment of the present invention.

DESCRIPTION OF THE EMBODIMENTS

Embodiments of a zoom lens and an image pickup apparatus are described below.

Embodiments

Figure 2A:
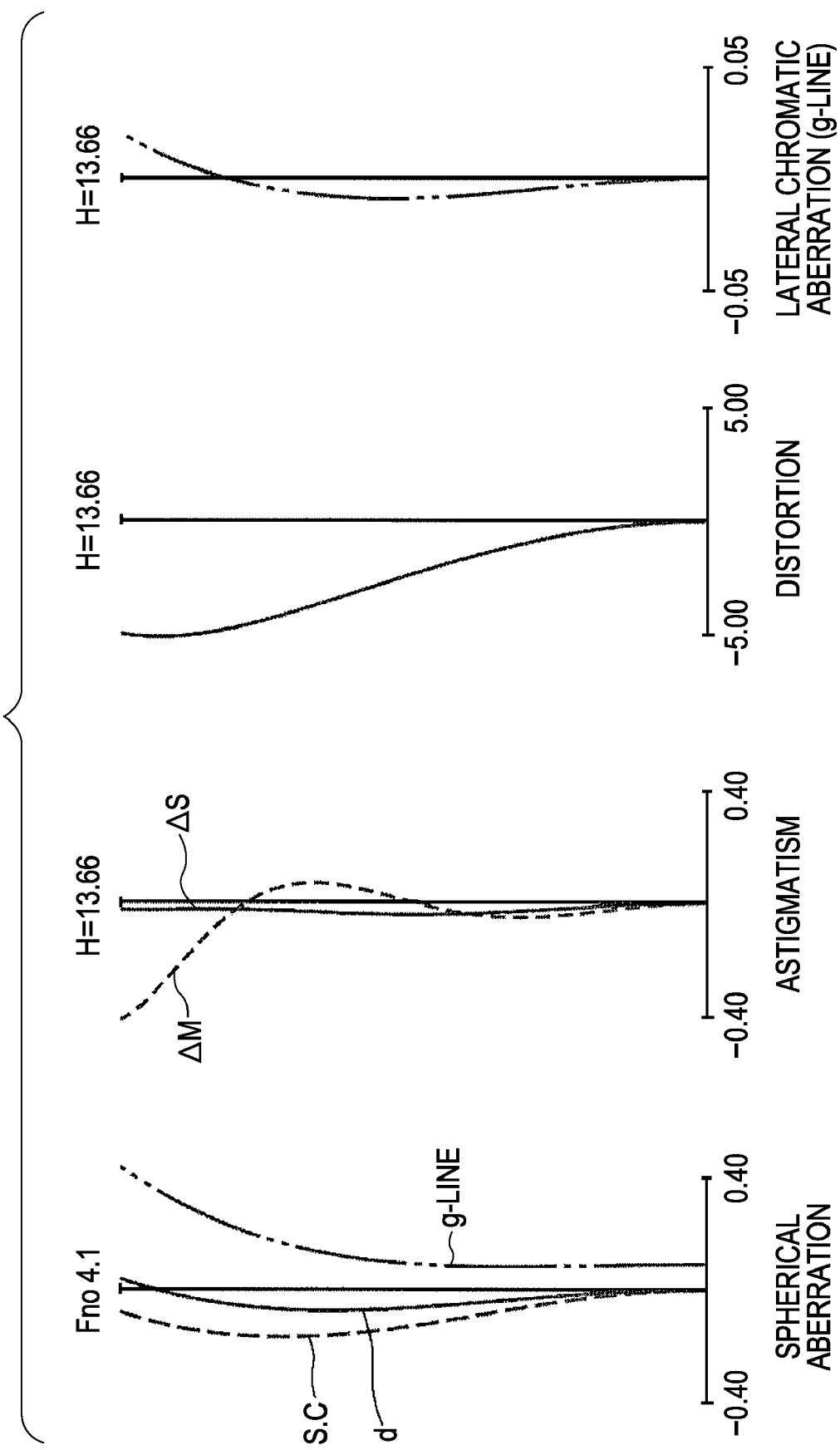
FIGS. 2A to 2C illustrate aberration diagrams at the wide-angle end according to the first embodiment of the present invention.
Figure 2B:
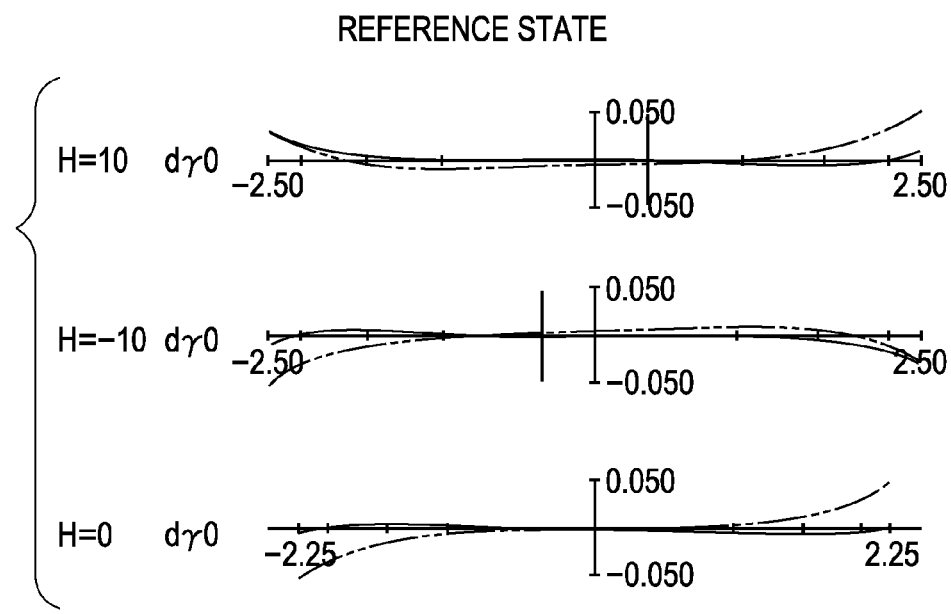
Figure 2C:
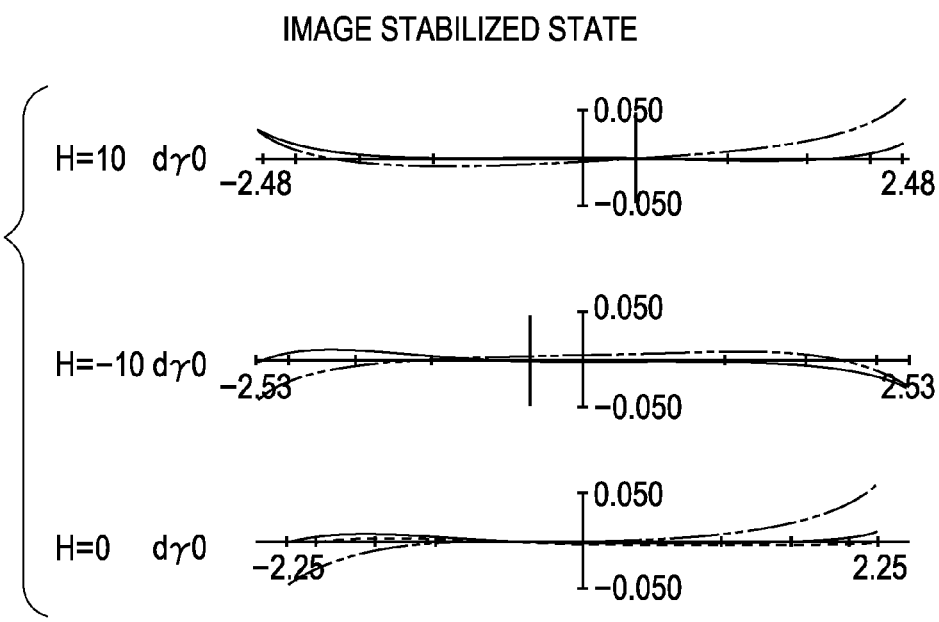

FIG. 1 is a cross-sectional view of a zoom lens at a wide-angle end (short focal length end) according to a first embodiment of the present invention. FIGS. 2A to 2C illustrate aberration diagrams of the zoom lens at the wide-angle end, and FIGS. 3A to 3C illustrate aberration diagrams of the zoom lens at a telephoto end (long focal length end), according to the first embodiment.

Throughout the drawings, each figure A is a longitudinal aberration diagram, and each figure B is a lateral aberration diagram. The figures A and B show aberrations in a reference state (at the infinite object distance). Each figure C is a lateral aberration diagram when the position of an image of an object at infinity is changed by a field angle of about 0.3 degree (in an image stabilized state).

Figure 5A:
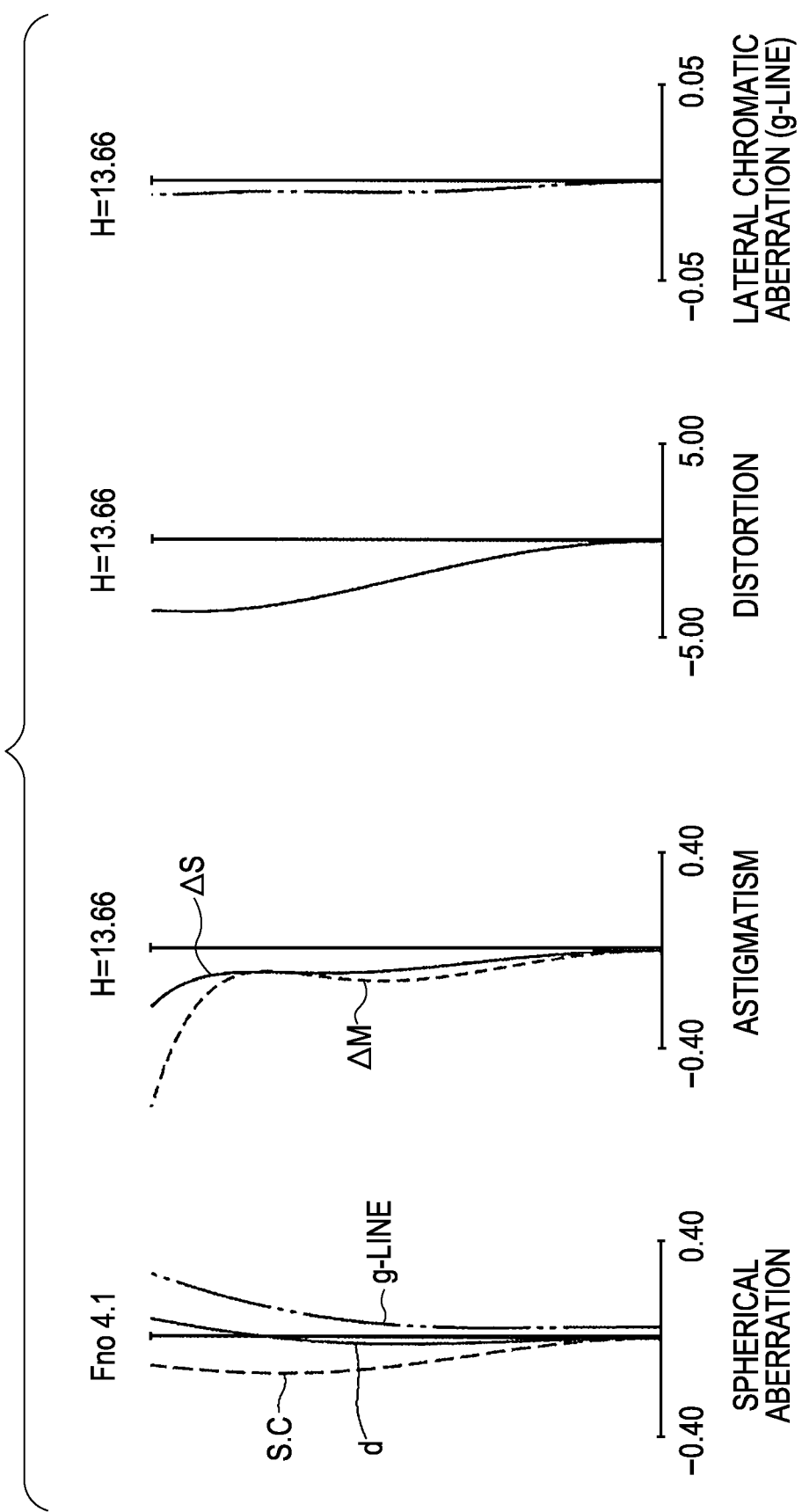
FIGS. 5A to 5C illustrate aberration diagrams at the wide-angle end according to the second embodiment of the present invention.
Figure 5B:
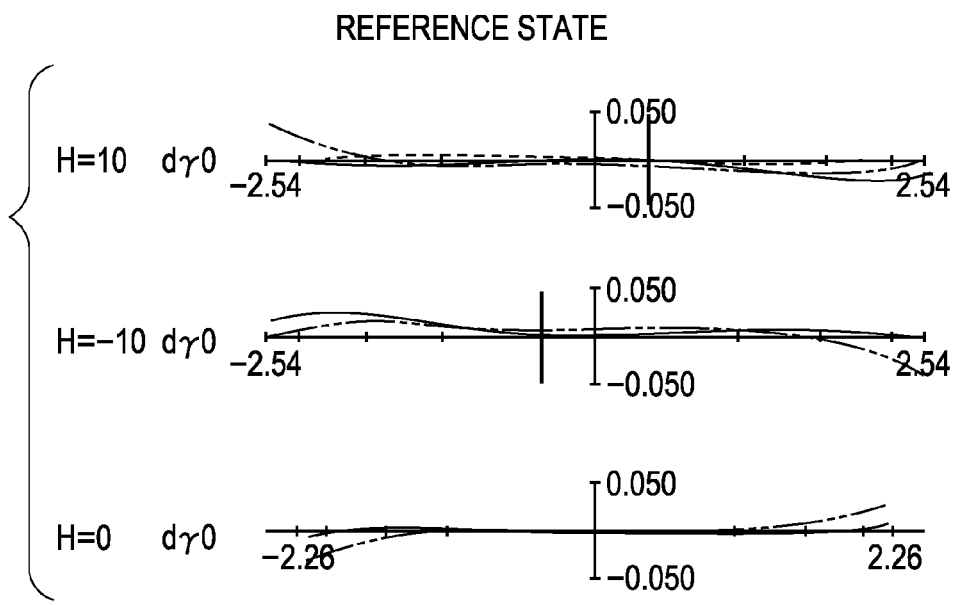
Figure 5C:
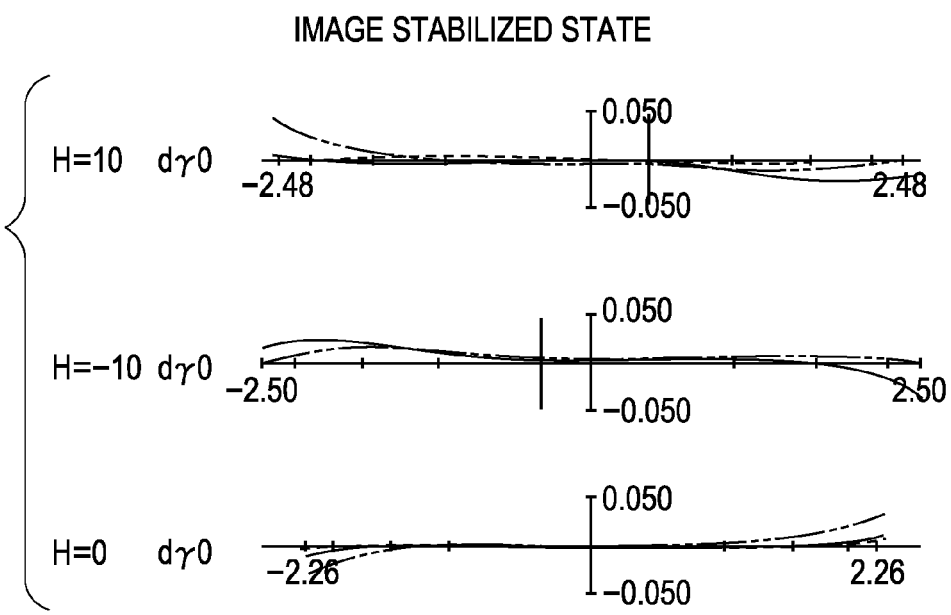

FIG. 4 is a cross-sectional view of a zoom lens at a wide-angle end according to a second embodiment of the present invention. FIGS. 5A to 5C illustrate aberration diagrams of the zoom lens at the wide-angle end, and FIGS. 6A to 6C illustrate aberration diagrams of the zoom lens at a telephoto end, according to the second embodiment.

Figure 7:
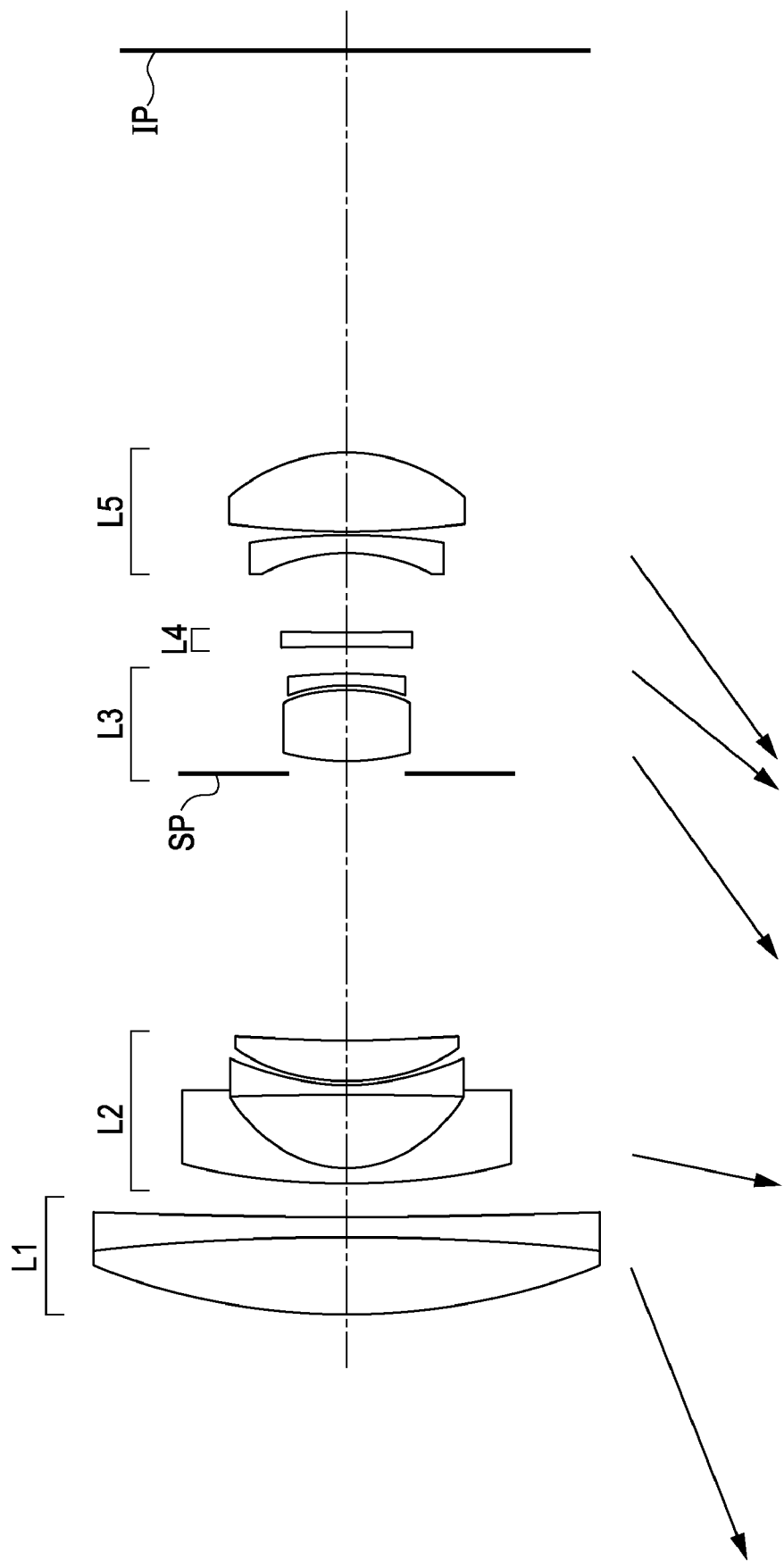
FIG. 7 is a cross-sectional view of a zoom lens at a wide-angle end according to a third embodiment of the present invention.
Figure 8A:
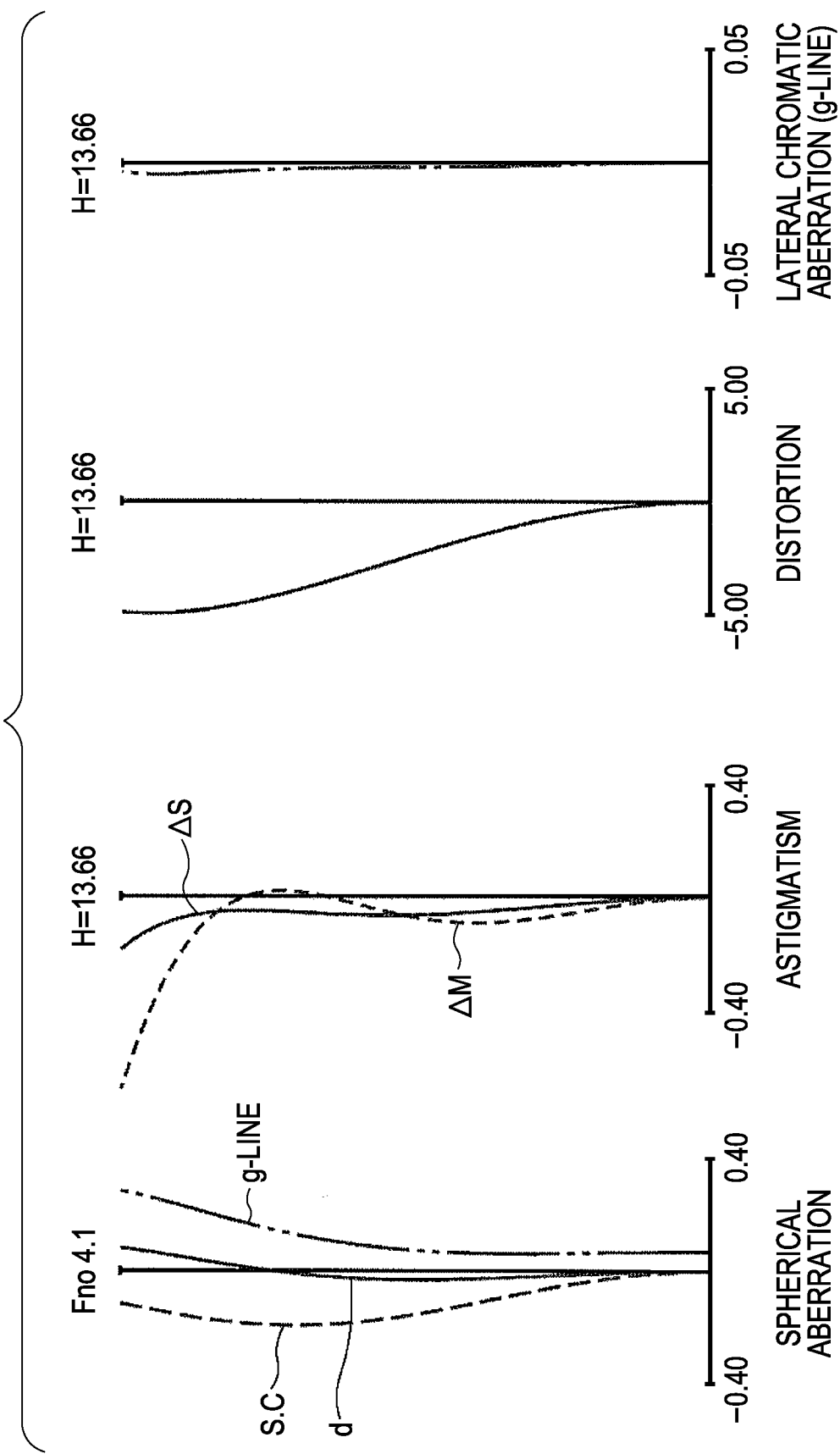
FIGS. 8A to 8C illustrate aberration diagrams at the wide-angle end according to the third embodiment of the present invention.
Figure 8B:
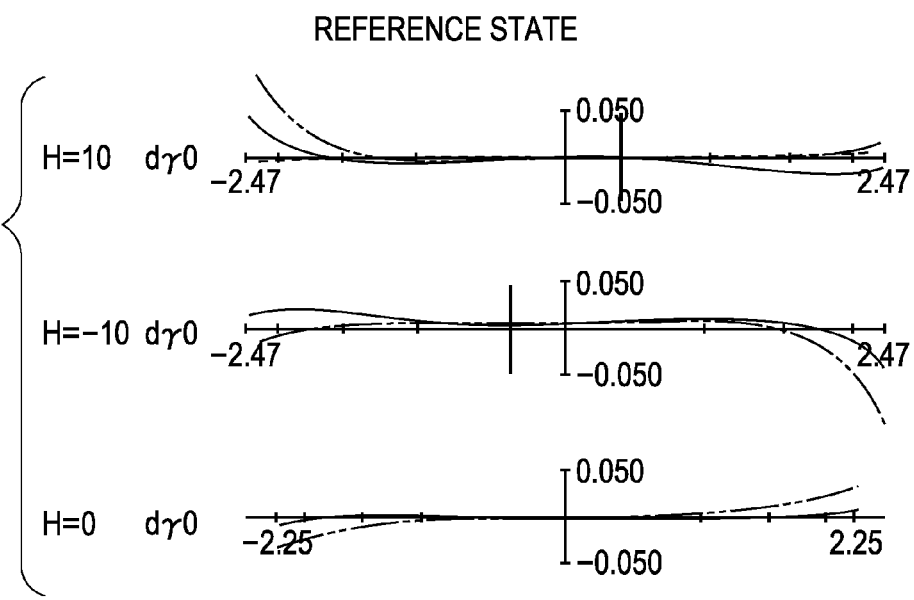
Figure 8C:
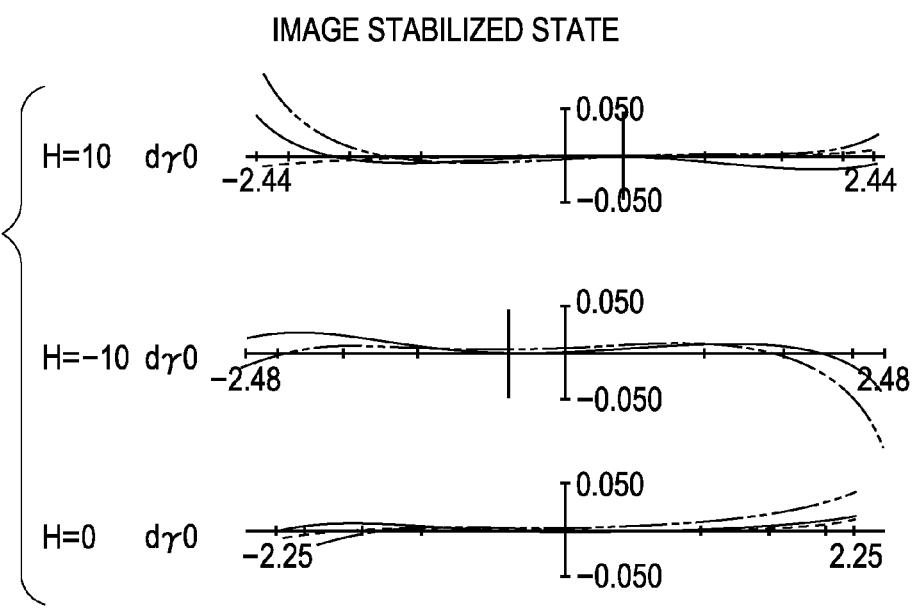

FIG. 7 is a cross-sectional view of a zoom lens at a wide-angle end according to a third embodiment of the present invention. FIGS. 8A to 8C illustrate aberration diagrams of the zoom lens at the wide-angle end, and FIGS. 9A to 9C illustrate aberration diagrams of the zoom lens at a telephoto end, according to the third embodiment.

Figure 10:
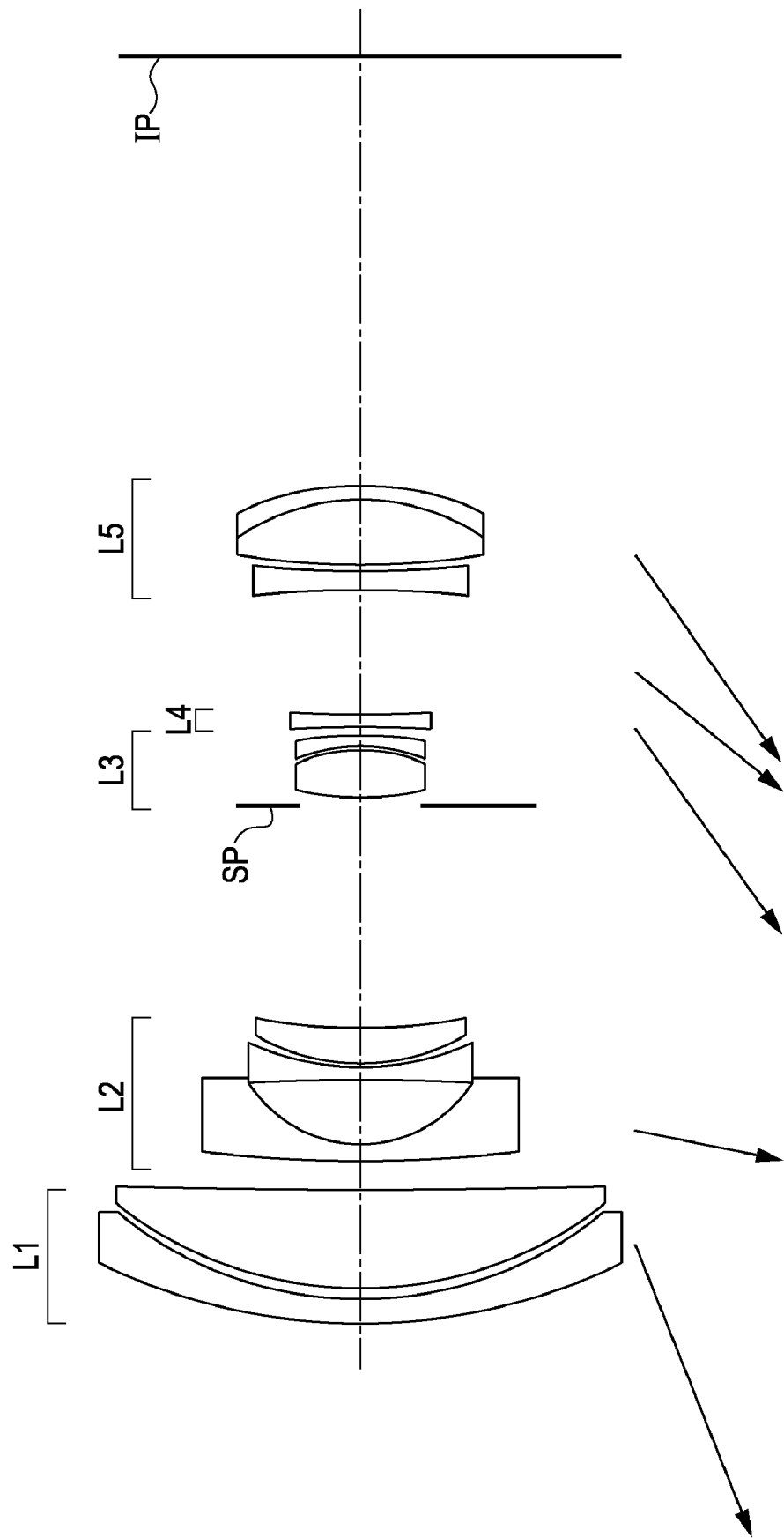
FIG. 10 is a cross-sectional view of a zoom lens at a wide-angle end according to a fourth embodiment of the present invention.
Figure 11A:
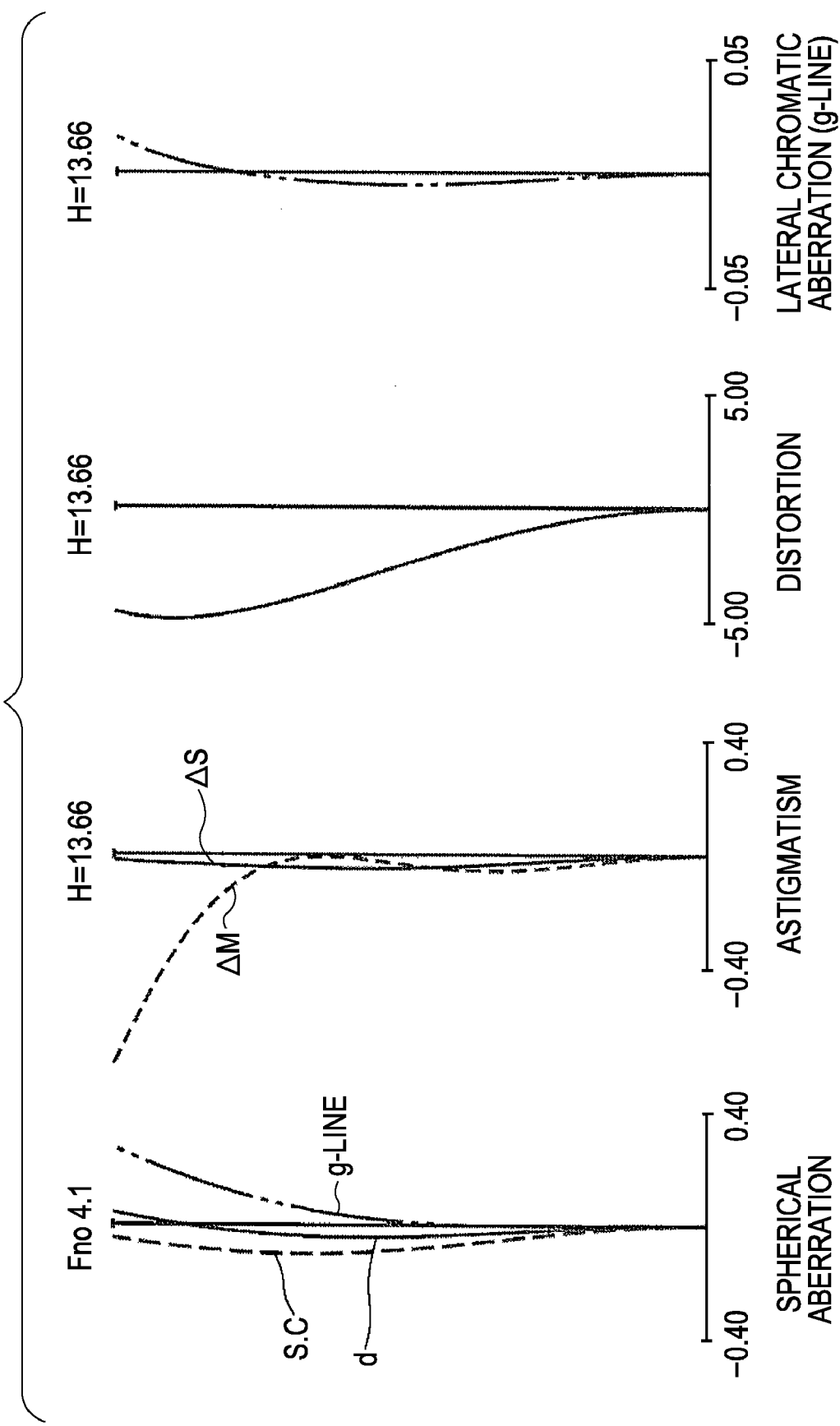
FIGS. 11A to 11C illustrate aberration diagrams at the wide-angle end according to the fourth embodiment of the present invention.
Figure 11B:
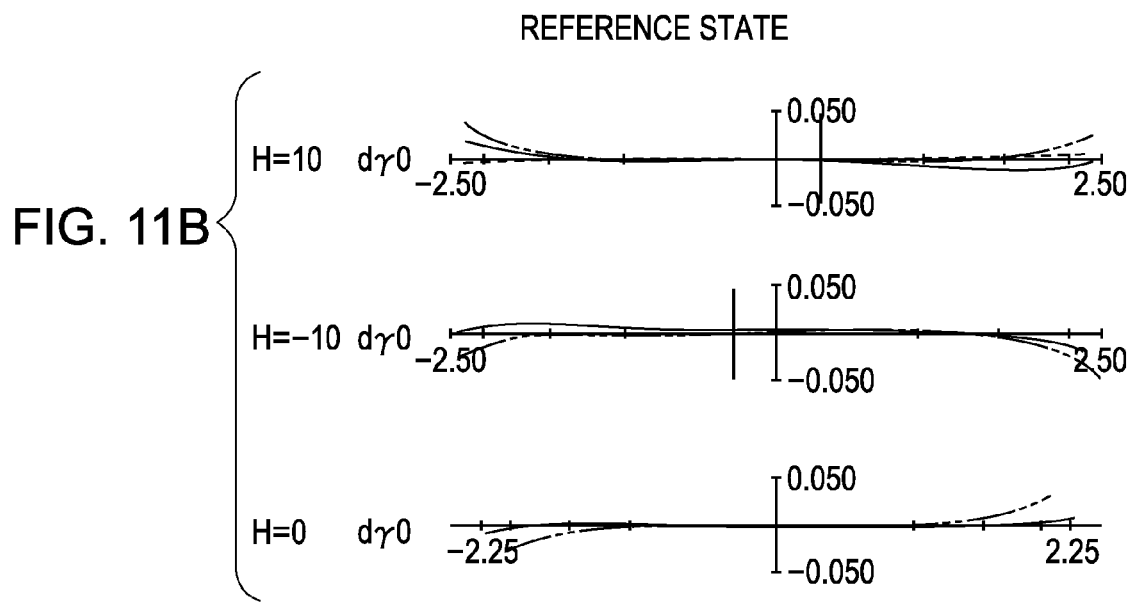
Figure 11C:
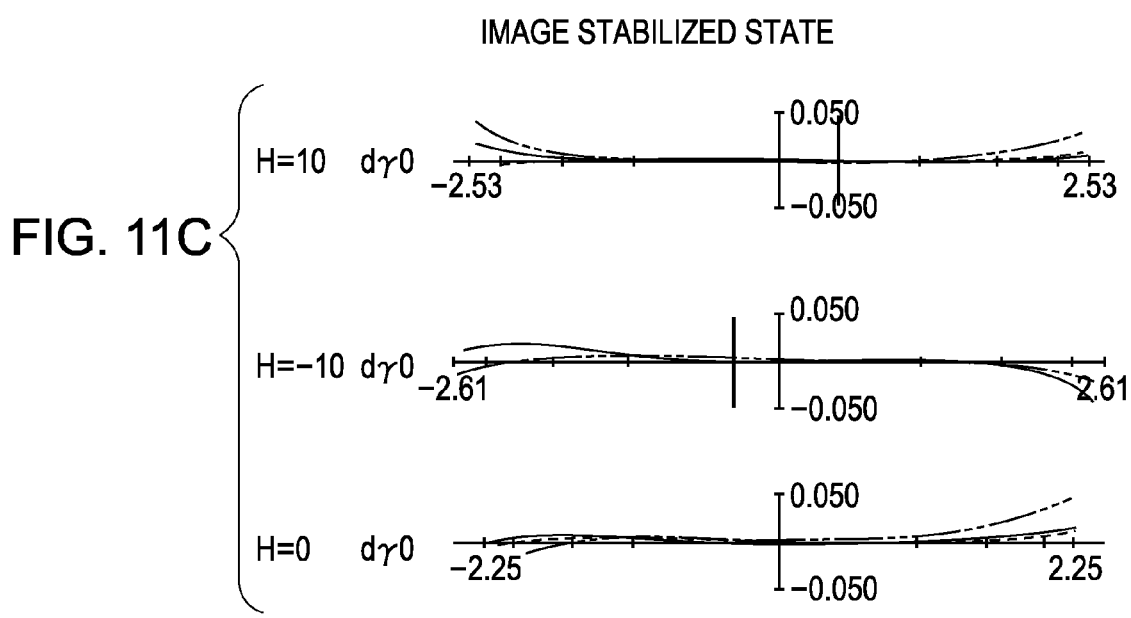

FIG. 10 is a cross-sectional view of a zoom lens at a wide-angle end according to a fourth embodiment of the present invention. FIGS. 11A to 11C illustrate aberration diagrams of the zoom lens at the wide-angle end, and FIGS. 12A to 12C illustrate aberration diagrams of the zoom lens at a telephoto end, according to the fourth embodiment.

Figure 13:
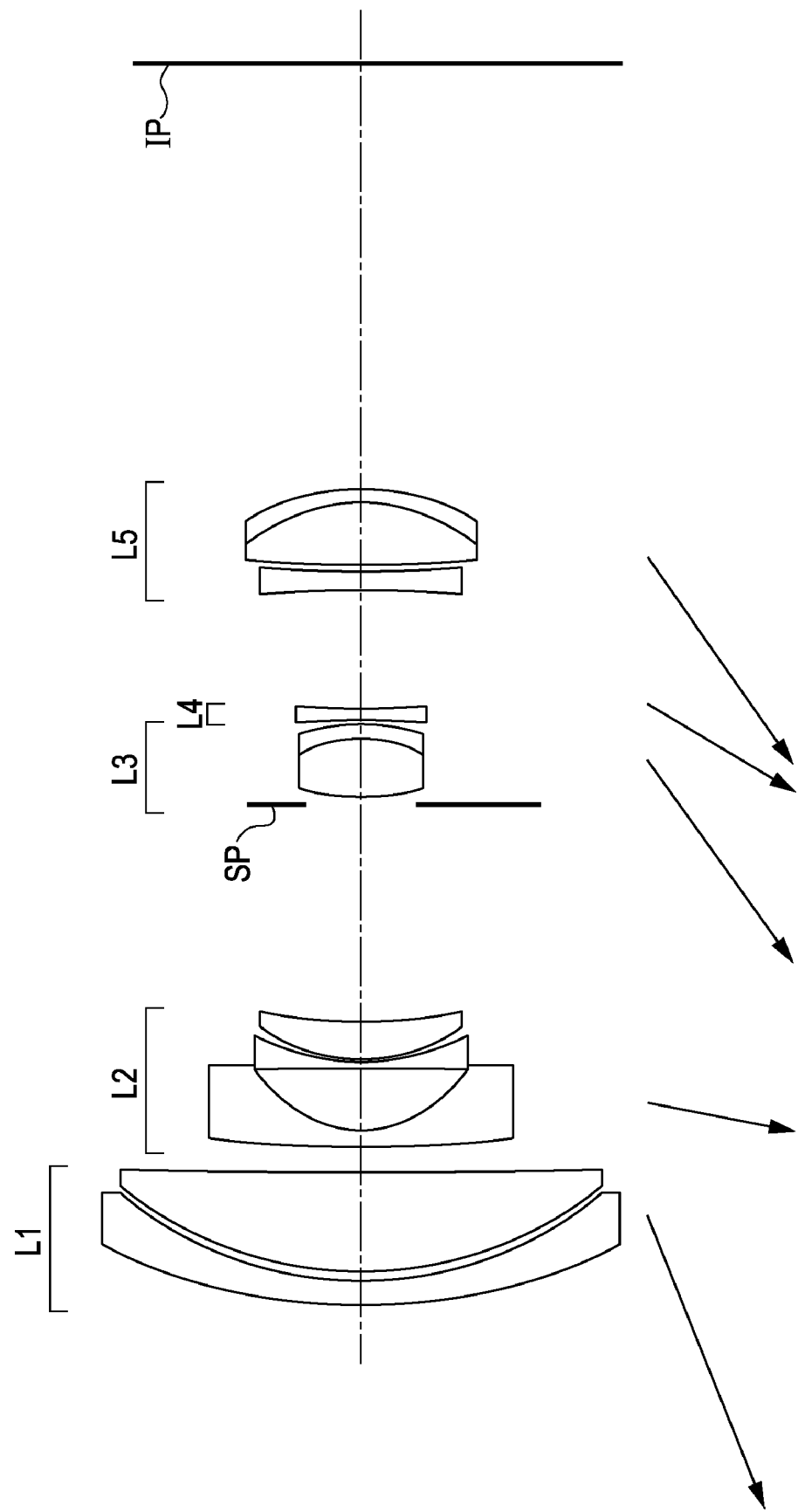
FIG. 13 is a cross-sectional view of a zoom lens at a wide-angle end according to a fifth embodiment of the present invention.
Figure 14A:
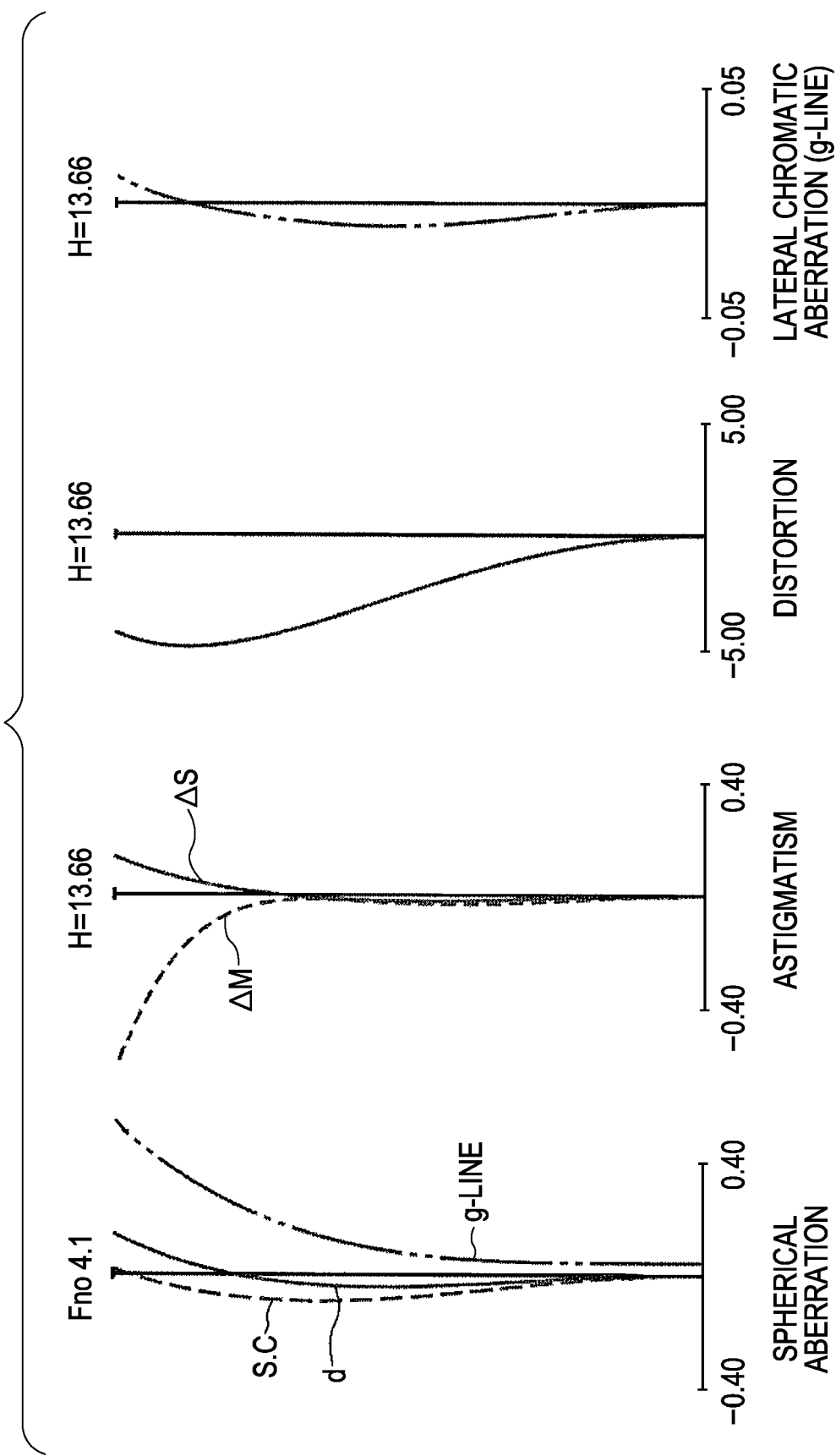
Figure 15B:
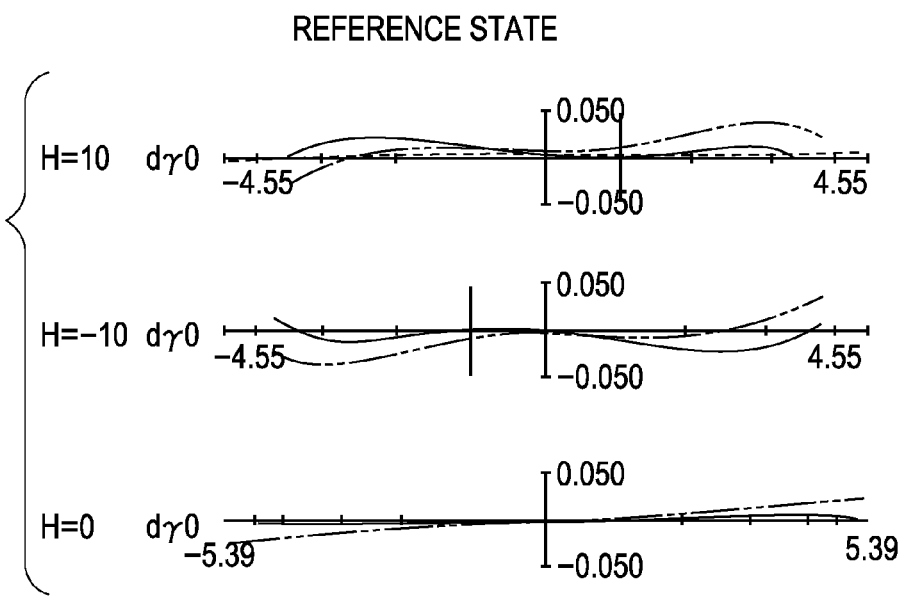
Figure 15C:
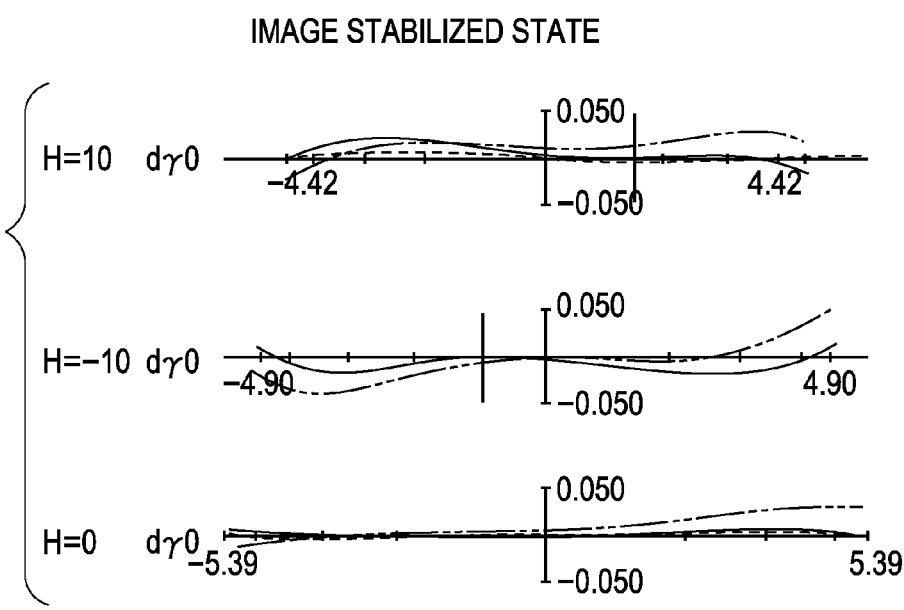

FIG. 13 is a cross-sectional view of a zoom lens at a wide-angle end according to a fifth embodiment of the present invention. FIGS. 14A to 14C illustrate aberration diagrams of the zoom lens at the wide-angle end, and FIGS. 15A to 15C illustrate aberration diagrams of the zoom lens at a telephoto end, according to the fifth embodiment.

Figure 16:
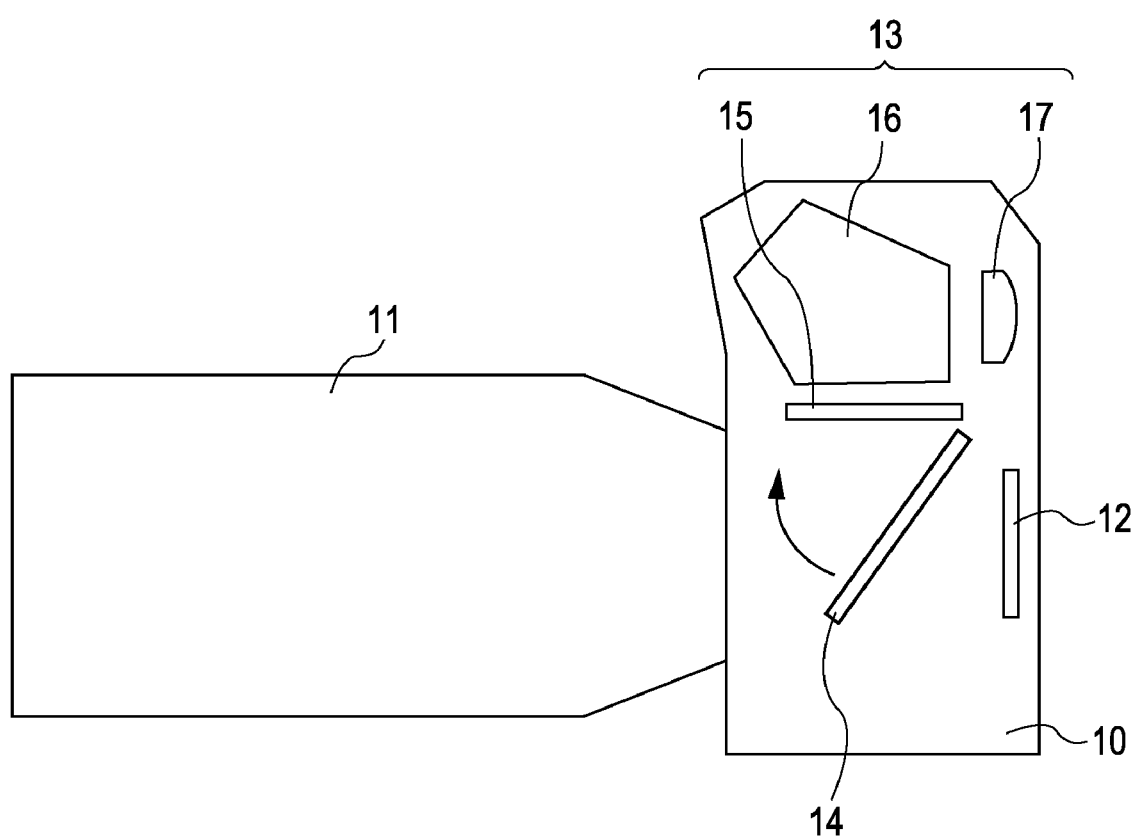
FIG. 16 is a schematic illustration showing a primary portion of an image pickup apparatus according to an exemplary embodiment of the present invention.

FIG. 16 is a schematic illustration showing a primary portion of a camera (image pickup apparatus) having the zoom lens according to one of the embodiments of the present invention.

The zoom lens of each of the embodiments is a photographing lens system for an image pickup apparatus, such as a video camera, a digital camera, or a silver-halide film camera.

In each cross-sectional view of the zoom lens, the left side indicates an object side (front side) whereas the right side indicates an image side (rear side). Reference character L1 denotes a first lens unit with a positive refractive power (optical power=reciprocal of focal length), character L2 denotes a second lens unit with a negative refractive power, character L3 denotes a third lens unit with a positive refractive power, character L4 denotes a fourth lens unit with a negative refractive power, and character L5 denotes a fifth lens unit with a negative refractive power.

The fourth lens unit L4 serves as an image stabilizing lens unit which is moved in such a manner as to have a component in a direction orthogonal to an optical axis so as to shift a shot image in the direction orthogonal to the optical axis during image stabilization.

Reference character SP denotes an aperture stop that is located at the object side of the third lens unit L3 and adjusts the quantity of light.

Reference character IP denotes an image plane. The image plane IP corresponds to an image pickup surface of a solid-state image pickup element (photoelectric conversion element), such as a charge-coupled device (CCD) sensor, or a complementary metal-oxide semiconductor (CMOS) sensor, when being used as a photographing optical system for a video camera or a digital still camera. When being used as a photographing optical system for a silver-halide film camera, the image plane IP corresponds to a film surface.

In the aberration diagrams, reference characters d and g denote the d-line and the g-line. Reference character S.C denotes a sine condition. Reference character ΔM denotes a meridional image plane with the d-line, and character ΔS denotes a sagittal image plane with the d-line. A lateral chromatic aberration is expressed with the g-line. Reference character Fno denotes an F-number, and character H denotes an image height.

Throughout the description given below, it is assumed that a lens unit is a group that is composed of a lens or a plurality of lenses, and is movable independently of adjacent lens units during zooming.

In each cross-sectional view of the zoom lens, arrows indicate movement loci of the lens units during zooming from the wide-angle end to the telephoto end.

The zoom lens of each of the embodiments moves the lens units toward the object side such that distances between the lens units at the telephoto end are as follows with respect to the case of the wide-angle end during zooming.

In particular, the zooming operation moves the lens units such that the distance between the first lens unit L1 and the second lens unit L2 increases, the distance between the second lens unit L2 and the third lens unit L3 decreases, the distance between the third lens unit L3 and the fourth lens unit L4 increases, and the distance between the fourth lens unit L4 and the fifth lens unit L5 decreases.

In each of the embodiments, the wide-angle end and the telephoto end represent zooming positions at both limits of a range where zooming lens units (in each of the embodiments, the first to fifth lens units L1 to L5) can mechanically move along the optical axis.

The first lens unit L1 with the positive refractive power is moved to the object side during zooming from the wide-angle end to the telephoto end. A zooming function is mainly offered by the second lens unit L2 with the negative refractive power. Such an arrangement promotes reduction in size of the entire system.

Since the third to fifth lens units L3 to L5 move along the optical axis in a manner described above during zooming, such an arrangement defines a telephoto lens system at the telephoto end, thereby reducing the length of the entire optical system.

In each of the embodiments, the first to fifth lens units L1 to L5 move to the object side during zooming from the wide-angle end to the telephoto end.

The second lens unit L2 with a relatively large refractive power performs focusing through the movement along the optical axis because the amount of feeding can be small.

The fourth lens unit L4 is composed of a biconcave lens. The fourth lens unit L4 is moved in such a manner as to have a component in the direction orthogonal to the optical axis so as to shift an image formed with the entire system in the direction orthogonal to the optical axis. That is, the fourth lens unit L4 stabilizes an image.

In each of the embodiments, since the fourth lens unit L4 is composed of a single lens, the fourth lens unit L4 can be reduced in weight, a driving unit configured to move the lens in such a manner as to have a component in the direction orthogonal to the optical axis to stabilize an image can be reduced in size, and an image can be stabilized quickly. In addition, the entire lens system can be reduced in size.

In each of the embodiments, the following condition is satisfied:

$$0.50 < |ft/f4| < 1.50 \quad (1)$$

where ft is focal length of the entire system at the telephoto end, and f4 is a focal length of the fourth lens unit L4.

Since the fourth lens unit L4 is composed of the single negative lens for image stabilization, correction for chromatic aberration with the fourth lens unit L4 may be insufficient. In particular, lateral chromatic aberration during image stabilization may increase. Thus, the conditional equation (1) is satisfied in the case where the fourth lens unit L4 is composed of the single negative lens.

The conditional equation (1) is to properly determine the ratio of the focal length of the entire system at the telephoto end to the focal length of the fourth lens unit L4, to reliably correct the lateral chromatic aberration during image stabilization, to provide a sufficiently high zoom ratio, and to obtain a proper image shaking sensitivity.

It is noted that the image shaking sensitivity is indicated by a ratio of the amount $\Delta X$ of correction of an image blur to the amount $\Delta H$ of unit movement of the image stabilizing lens unit.

If the value is below the lower limit of the conditional equation (1), the refractive power of the fourth lens unit L4 is so small that it is difficult to provide a sufficiently high zoom ratio. Also, the image shaking sensitivity is so small that the amount of movement of the fourth lens unit L4 in such a manner as to have a component in the direction orthogonal to the optical axis for correcting the image blur becomes large, resulting in an increase in lens diameter.

If the value is above the upper limit of the conditional equation (1), the refractive power of the fourth lens unit L4 is so large that the lateral chromatic aberration during image stabilization increases.

With the arrangement satisfying the conditional equation (1), the zoom lens can be provided that has a reliable image stabilizing function, a sufficiently long back focus, and a high optical performance over the entire zooming range.

In each of the embodiments, at least one of the following conditional equations (2) to (8) is satisfied, thereby obtaining at least one of the advantages of the conditional equations.

The conditional equation (2) is as follows:

$$-0.40 < (r1+r2)/(r1-r2) < 0.00 \quad (2)$$

where r1 is a radius of curvature of a lens surface on the object side of the single negative lens of the fourth lens unit L4, and r2 is a radius of curvature of a lens surface on the image side thereof.

The conditional equation (2) relates to the radii of curvature of the surfaces on the object and image sides of the single negative lens of the fourth lens unit L4. The conditional equation (2) is to mainly correct spherical aberration and curvature of field.

Also, the conditional equation (2) is to properly determine the radii of curvature of the object and image sides of the negative lens, and to prevent coma from occurring during image stabilization at the telephoto end.

Since the fourth lens unit L4 as the image stabilizing lens unit is composed of the single negative lens, it is important to optimize the shape of the negative lens for correction of aberrations.

If the value is below the lower limit of the conditional equation (2), the curvature of the lens surface on the object side becomes relatively large. Accordingly, an advantage of correction can be easily yielded for the spherical aberration in the reference state, however, the coma increases during image stabilization.

If the value is above the upper limit, the curvature of the lens surface on the image side becomes relatively large. The curvature of field increases from the wide-angle end to the telephoto end, and fluctuation in curvature of field becomes large during zooming.

The conditional equation (3) is as follows:

$$0.00 < d4/ft < 0.03 \quad (3)$$

where d4 is an axial distance between the lens surface on the object side of the single negative lens of the fourth lens unit L4 and the lens surface on the image side thereof.

The conditional equation (3) is to determine the thickness of the single negative lens of the fourth lens unit L4 as the image stabilizing lens unit, and to reduce the size of the entire system accordingly.

If the value is below the lower limit of the conditional equation (3), the thickness of the negative lens is so small that it is difficult to process the negative lens. If the value is above the upper limit, the thickness of the negative lens is so large that it is difficult to reduce the weight of the image stabilizing lens unit, and the total length of lenses increases.

The conditional equation (4) is as follows:

$$45.0 < vd \quad (4)$$

where vd is an Abbe number of a material of the single negative lens of the fourth lens unit L4.

The conditional equation (4) determines the Abbe number of the material of the single negative lens of the fourth lens unit L4 as the image stabilizing lens unit. The conditional equation (4) is mainly to correct the chromatic aberration reliably.

Since the fourth lens unit L4 is composed of the single negative lens, it is important to correct the chromatic aberration to a certain degree with the fourth lens unit L4.

Also, since the fourth lens unit L4 serves as the image stabilizing lens unit, the chromatic aberration is desired to be corrected to a certain degree with the fourth lens unit L4 in order to prevent the chromatic aberration during image stabilization.

If the value is below the lower limit of the conditional equation (4), fluctuation in longitudinal chromatic aberration increases during zooming, and it is difficult to correct the lateral chromatic aberration during image stabilization.

The conditional equation (5) is as follows:

$$0.05 < B4/B3 < 0.60 \quad (6)$$

where B3 is an axial air distance between the third lens unit L3 and the fourth lens unit L4 at the telephoto end, and B4 is an axial air distance between the fourth lens unit L4 and the fifth lens unit L5 at the telephoto end.

The conditional equation (5) determines the positional relationships between the fourth lens unit L4 and the third lens unit L3, and between the fourth lens unit L4 and the fifth lens unit L5, at the telephoto end. The conditional equation (5) is to reliably correct the curvature of field during image stabilization, and to reduce the total length of lenses at the telephoto end.

If the value is below the lower limit of the conditional equation (5), the fourth lens unit L5 comes too close to the fifth lens unit L5 at the telephoto end, the situation which is undesirable because both lens units may interfere with each other. If the value is above the upper limit, the total length of lenses may increase because the entire system no longer defines the telephoto lens system.

The conditional equation (6) is as follows:

$$0.30 < \beta 4T \cdot \beta 5T < 0.90 \quad (6)$$

where β4T is a lateral magnification of the fourth lens unit L4, and β5T is a lateral magnification of the fifth lens unit L5, at the telephoto end.

The conditional equation (6) relates to the lateral magnifications of the fourth lens unit L4 and the fifth lens unit L5 at the telephoto end. The conditional equation (6) is to keep a high optical performance as well as a proper image shaking sensitivity.

When the image shaking sensitivity is too small, the amount of movement of the image stabilizing lens unit usually increases, causing the lens diameter to increase. When the image shaking sensitivity is too large, it is difficult to control the position of the image stabilizing lens unit in such a manner as to have a component in the direction orthogonal to the optical axis.

If the value is below the lower limit of the conditional equation (6), the image shaking sensitivity becomes small and the negative lens for image stabilization increases in size in the radial direction. If the value is above the upper limit, the image shaking sensitivity becomes large and it is difficult to control the position of the negative lens for image stabilization. Also, the refractive power of the negative lens becomes large, and it is difficult to correct image plane variation during zooming.

The conditional equation (7) is as follows:

$$-0.30 < f2/f1 < -0.10 \quad (7)$$

where f1 is a focal length of the first lens unit L1, and f2 is a focal length of the second lens unit L2.

The conditional equation (7) relates to the ratio of the focal length of the second lens unit L2 to that of the first lens unit L1. The conditional equation (7) is mainly to reduce the size of the entire system, and also to realize a high performance of the entire system.

If the value is below the lower limit of the conditional equation (7), the refractive power of the second lens unit L2 becomes relatively so small that the entire system at the telephoto end no longer defines the telephoto lens system, thereby increasing the total length of lenses. If the value is above the upper limit of the conditional equation (7), the refractive power of the second lens unit L2 is so large that it is difficult to correct the spherical aberration at the telephoto end.

The conditional equation (8) is as follows:

$$0.40 < f3/f5 < 0.80 \quad (8)$$

where f3 is a focal length of the third lens unit L3, and f5 is a focal length of the fifth lens unit L5.

The conditional equation (8) is to keep the sufficient length of the back focus as well as the high performance.

If the value is below the lower limit of the conditional equation (8), the refractive power of the fifth lens unit L5 is so small that it is difficult to provide the sufficiently long back focus at the wide-angle end. If the value is above the upper limit, the refractive power of the fifth lens unit L5 is so large that it is difficult to correct the curvature of field at the wide-angle end.

In each of the embodiments, at least one of the above-described conditional equations (2) to (8) may be satisfied.

Also, in each of the embodiments, the numerical ranges of the conditional equations (1), (2), and (4) to (8) may be more particularly determined as follows:

$$0.70 < |ft/f4| < 1.30 \quad (1a)$$

$$-0.30 < (r1+r2)/(r1-r2) < -0.01 \quad (2a)$$

$$50.0 < vd \quad (4a)$$

$$0.10 < B4/B3 < 0.55 \quad (5a)$$

$$0.40 < \beta 4T \cdot \beta 5T < 0.75 \quad (6a)$$

$$-0.25 < f2/f1 < -0.12 \quad (7a)$$

$$0.45 < f3/f5 < 0.75 \quad (8a)$$

With each of the embodiments described above, the zoom lens with the zoom ratio of 3 or higher, the sufficiently long back focus, and the high optical performance over the entire zooming range can be provided by properly determining the arrangement and refractive power of the fourth lens unit L4 for image stabilization.

Also, with each of the embodiments, the zoom lens having the image stabilizing function can be provided, in which vibration compensation (image stabilization) can be quickly performed, the entire apparatus can be reduced in size, and a high quality image can be obtained even during vibration compensation.

Next, an exemplary embodiment of a single reflex camera system with the zoom lens according to one of the embodiments of the present invention is described with reference to FIG. 16. In FIG. 16, reference numeral 10 denotes a single reflex camera body, and numeral 11 denotes an interchangeable lens having the zoom lens mounted therein.

Reference numeral 12 denotes a recording unit such as a film or a solid-state image pickup element, configured to receive light of an object image obtained through the interchangeable lens 11.

Reference numeral 13 denotes a finder optical system configured to facilitate observation of the object image from the interchangeable lens 11, and numeral 14 denotes a quick return mirror turnable for transmitting the object image from the interchangeable lens 11 selectively to the recording unit 12 or the finder optical system 13.

A finder image of the object image can be observed in a manner that the object image passes the quick return mirror 14, is focused at a focus plate 15, is erected through a pentaprism 16, and is enlarged with an eyepiece 17.

When an image is shot, the quick return mirror 14 turns in a direction indicated by an arrow, and the object image is formed at the recording unit 12 and recorded therein. The reference numeral 18 is a submirror, and 19 is a focus detector.

As described above, the zoom lens according to one of the embodiments of this invention is applied to an optical apparatus such as the interchangeable lens of the single reflex camera, and thus, an optical apparatus with a high optical performance can be provided.

The present invention, of course, can be applied to a single reflex camera with no quick return mirror.

NUMERICAL EXAMPLES

Numerical Examples 1 to 5 corresponding to the first to fifth embodiments are shown. In each of the numerical examples, reference character i denotes an order of a surface counted from the object side, character Ri denotes a radius of curvature of each surface, character Di denotes a member thickness or an air distance between the i-th surface and the i+1-th surface, character Ni denotes a refractive index with the d-line, and character vi denotes an Abbe number with the d-line. When X represents a shift along the optical axis at a height h from the optical axis with respect to the surface vertex, the aspherical shape is expressed by Equation 1 as follows:

$$x = \frac{(1/R)h^2}{1 + \sqrt{\{1 - (1+k)(h/R)^2\}}} + Ah^4 + Bh^6 + Ch^6 + Dh^8 + Eh^{10} + Fh^{12} \quad \text{Equation 1}$$

where R is a paraxial radius of curvature, and A, B, C, D, E, and F are aspherical coefficients.

In the numerical examples, note that, [e-X] represents [×10$^{-x}$]. Reference character f denotes a focal length, character Fno denotes an F-number, and character H denotes an image height in a paraxial image plane. The relationship between the above-described conditional equations and numerical values of the numerical examples is shown in TABLE 1.

Numerical Example 1 f=18.55~63.05 Fno=4.10~5.63 2ω=72.6°~24.4°
R1=53.738 D1=2.00 N1=1.784723 v1=25.7
R2=34.687 D2=0.36
R3=35.787 D3=8.38 N2=1.696797 v2=55.5
R4=778.903 D4=Variable
R5=115.240 D5=1.40 N3=1.696797 v3=55.5
R6=10.896 D6=5.04
R7=-301.534 D7=1.05 N4=1.696797 v4=55.5
R8=19.393 D8=0.12
R9=15.505 D9=2.90 N5=1.846660 v5=23.9
R10=39.874 D10=Variable
R11=Aperture stop D11=0.70
R12=24.549 D12=6.00 N 6=1.657364 v6=45.1
R13=-11.463 D13=0.07
R14=-11.297 D14=1.00 N 7=1.846660 v7=23.9
R15=-24.973 D15=Variable
R16=-76.233 D16=1.20 N 8=1.603112 v8=60.6
R17=84.068 D17=Variable
R18=-27.766 D18=1.50 N 9=1.583060 v9=30.2
* R19=-74.829 D19=0.15
R20=74.082 D20=6.13 N10=1.487490 v10=70.2
R21=-17.752

\Focal length 18.55 32.58 63.05 Variable distance\
D4 2.58 13.12 32.36
D10 19.66 9.33 3.23
D15 0.56 5.16 9.80
D17 10.88 6.28 1.64

Aspherical Coefficient

19th surface: A=0.00000e+00 B=4.07344e-05 C=3.47537e-07 D=-8.85427e-09 E=1.20836e-10 F=-6.07420e-13

Numerical Example 2 f=18.55~63.02 Fno=4.10~5.61 2ω=72.6°~24.4°
R1=55.202 D1=7.40 N1=1.712995 v1=53.9
R2=-510.648 D2=1.80 N2=1.846660 v2=23.9
R3=220.569 D3=Variable
R4=36.539 D4=1.40 N3=1.772499 v3=49.6
R5=11.572 D5=7.54
R6=-108.603 D6=1.10 N4=1.712995 v4=53.9
R7=21.113 D7=0.12
R8=17.388 D8=3.70 N5=1.805181 v5=25.4
R9=60.950 D9=Variable
R10=Aperture stop D10=1.00
R11=18.241 D11=4.17 N6=1.624505 v6=57.0
R12=-21.209 D12=0.50
R13=-20.198 D13=1.00 N7=1.769027 v7=26.8
R14=-54.000 D14=Variable
R15=-60.176 D15=1.20 N8=1.603112 v8=60.6
R16=68.614 D16=Variable
R17=-15.102 D17=1.60 N9=1.583060 v9=30.2
* R18=-45.856 D18=0.20
R19=45.484 D19=6.50 N10=1.516330 v10=64.1
R20=-15.014

\Focal length 18.55 31.88 63.02 Variable distance\
D3 3.11 15.89 34.83
D9 24.17 11.46 1.85
D14 3.22 3.80 5.20
D16 4.68 4.09 2.69

Aspherical Coefficient

18th surface: A=0.00000e+00 B=9.04419e-05 C=7.05975e-07 D=-1.17756e-08 E=1.44613e-10 F=-7.15939e-13

Numerical Example 3 f=18.55~63.05 Fno=4.10~5.71 2ω=72.6°~24.4°
R1=59.300 D1=6.85 N1=1.712995 v1=53.9
R2=-195.598 D2=1.80 N2=1.846660 v2=23.9
R3=485.056 D3=Variable R4=62.545 D4=1.40 N3=1.696797 ν3=55.5
R5=11.372 D5=6.24
R6=−115.044 D6=1.10 N4=1.772499 ν4=49.6
R7=22.337 D7=0.12
R8=17.884 D8=3.70 N5=1.805181 ν5=25.4
R9=91.604 D9=Variable
R10=Aperture stop D10=1.00
R11=20.187 D11=6.29 N6=1.672832 ν6=51.0
R12=−15.229 D12=0.47
R13=−14.249 D13=1.00 N7=1.778115 ν7=27.5
R14=−54.000 D14=Variable
R15=−77.652 D15=1.20 N8=1.696797 ν8=55.5
R16=97.451 D16=Variable
R17=−15.888 D17=1.60 N9=1.583060 ν9=30.2
* R18=−33.737 D18=0.19
R19=67.136 D19=7.00 N10=1.516330 ν10=64.1
R20=−16.129

\Focal length 18.55 31.97 63.05 Variable distance\
D3 2.98 15.14 32.81
D9 23.66 11.15 1.85
D14 2.40 3.93 6.39
D16 6.98 5.44 2.99

Aspherical Coefficient

18th surface: A=0.00000e+00 B=6.01775e−05 C=6.45670e−07 D=−1.12353e−08 E=1.47332e−10 F=−7.87412e−13

Numerical Example 4 f=18.55~63.03 Fno=4.10~5.78 2ω=72.6°~24.4°
R1=48.517 D1=2.00 N1=1.846660 ν1=23.9
R2=31.293 D2=0.86
R3=32.124 D3=8.10 N2=1.712995 ν2=53.9
R4=657.796 D4=Variable
R5=97.856 D5=1.40 N3=1.696797 ν3=55.5
R6=10.592 D6=5.26
R7=−112.227 D7=1.10 N4=1.696797 ν4=55.5
R8=20.912 D8=0.12
R9=16.272 D9=3.00 N5=1.846660 ν5=23.9
R10=42.920 D10=Variable
R11=Aperture stop D11=0.70
R12=20.824 D12=3.93 N6=1.605806 ν6=41.6
R13=−12.730 D13=0.17
R14=−12.419 D14=1.00 N7=1.846660 ν7=23.9
R15=−26.748 D15=Variable
* R16=−78.821 D16=1.00 N8=1.530000 ν8=55.8
R17=84.406 D17=Variable
R18=−89.138 D18=1.60 N9=1.583060 ν9=30.2
* R19=165.184 D19=0.40
R20=56.009 D20=5.40 N10=1.603112 ν10=60.6
R21=−17.606 D21=1.10 N11=1.846660 ν11=23.9
R22=−23.420

\Focal length 18.55 31.79 63.03 Variable distance\
D4 2.38 11.10 27.93
D10 18.23 9.05 2.85
D15 0.64 4.68 9.20
D17 10.04 6.00 1.48

Aspherical Coefficient

16th surface: A=0.00000e+00 B=7.92164e−08 C=−3.39488e−09 D=5.18237e−10 E=0.00000e+00 F=0.00000e+00

19th surface: A=0.00000e+00 B=3.33974e−05 C=3.03707e−07 D=−8.68560e−09 E=1.23592e−10 F=−6.30102e−13

Numerical Example 5 f=17.60~63.06 Fno=4.10~5.85 2ω=75.5°~24.4°
R1=46.994 D1=2.00 N1=1.846660 ν1=23.9
R2=30.802 D2=0.73
R3=31.621 D3=8.11 N2=1.712995 ν2=53.9
R4=645.210 D4=Variable
R5=114.802 D5=1.40 N3=1.696797 ν3=55.5
R6=10.037 D6=4.69
R7=−207.426 D7=1.05 N4=1.772499 ν4=49.6
R8=20.164 D8=0.12
R9=14.884 D9=2.90 N5=1.846660 ν5=23.9
R10=36.576 D10=Variable
R11=Aperture stop D11=0.70
R12=21.280 D12=4.74 N6=1.616536 ν6=40.2
R13=−10.204 D13=0.08
R14=−9.995 D14=1.00 N7=1.846660 ν7=23.9
R15=−19.920 D15=Variable
R16=−52.584 D16=0.90 N8=1.530000 ν8=55.8
* R17=81.881 D17=Variable
R18=−49.418 D18=1.50 N9=1.583060 ν9=30.2
* R19=493.147 D19=0.40
R20=103.656 D20=5.20 N10=1.589130 ν10=61.1
R21=−14.521 D21=1.10 N11=1.846660 ν11=23.9
R22=−18.443

\Focal length 17.60 31.14 63.06 Variable distance\
D4 2.11 10.89 27.51
D10 17.87 8.81 2.99
D15 0.44 4.70 8.78
D17 9.68 5.42 1.33

Aspherical Coefficient

17th surface: A=0.00000e+00 B=−8.39285e−07 C=−4.55903e−08 D=−3.22198e−09 E=0.00000e+00 F=0.00000e+00

19th surface: A=0.00000e+00 B=4.19846e−05 C=2.43233e−07 D=−7.42857e−09 E=1.20785e−10 F=−7.14065e−13

TABLE 1

| Conditional Expression | Numerical Example 1 | Numerical Example 2 | Numerical Example 3 | Numerical Example 4 | Numerical Example 5 |
|---|---|---|---|---|---|
| (1) ft/f4 | −0.95 | −1.19 | −1.02 | −0.82 | −1.05 |
| (2) (r1 + r2)/(r1 − r2) | −0.05 | −0.07 | −0.11 | −0.03 | −0.22 |
| (3) d4/ft | 0.02 | 0.02 | 0.02 | 0.02 | 0.01 |
| (4) νd | 60.6 | 60.6 | 55.5 | 55.8 | 55.8 |
| (5) β4/β3 | 0.17 | 0.52 | 0.47 | 0.16 | 0.15 |
| (6) β4T · β5T | 0.65 | 0.67 | 0.54 | 0.44 | 0.67 |
| (7) f2/f1 | −0.17 | −0.17 | −0.17 | −0.17 | −0.16 |
| (8) f3/f5 | 0.54 | 0.61 | 0.64 | 0.59 | 0.50 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-342587 filed Dec. 20, 2006, which is hereby incorporated by reference herein in its entirety.

What is claimed is:

1. A zoom lens comprising:
a first lens unit having a positive refractive power;
a second lens unit having a negative refractive power;
a third lens unit having a positive refractive power;
a fourth lens unit having a negative refractive power; and
a fifth lens unit having a positive refractive power, the first to fifth lens units being arranged from an object side to an image side in that order,
wherein the zoom lens performs zooming by moving the first to fifth lens units from a wide-angle end to a telephoto end such that a distance between the first lens unit and the second lens unit increases, a distance between the second lens unit and the third lens unit decreases, a distance between the third lens unit and the fourth lens unit increases, and a distance between the fourth lens unit and the fifth lens unit decreases,
wherein the fourth lens unit consists of a negative lens, the fourth lens unit being moved in such a manner so as to have a component in a direction orthogonal to an optical axis so as to shift an image formed with an entire system in the direction orthogonal to the optical axis, and
wherein the following condition is satisfied:

$0.50 < |ft/f4| < 1.50$, where ft is a focal length of the entire system, and f4 is a focal length of the fourth lens unit, both at the telephoto end.

2. The zoom lens according to claim 1, wherein the following condition is satisfied:

$-0.40 < (r1+r2)/(r1-r2) < 0.00$, where r1 is a radius of curvature of a lens surface on the object side of the negative lens of the fourth lens unit, and r2 is a radius of curvature of a lens surface on the image side thereof.

3. The zoom lens according to claim 1, wherein the following condition is satisfied:

$0.00 < d4/ft < 0.03$, where d4 is an axial distance between the lens surface on the object side of the negative lens of the fourth lens unit and the lens surface on the image side thereof.

4. The zoom lens according to claim 1, wherein the following condition is satisfied:

$45.0 < vd$, where vd is an Abbe number of a material of the negative lens of the fourth lens unit.

5. The zoom lens according to claim 1, wherein the following condition is satisfied:

$0.05 < B4/B3 < 0.60$, where B3 is an axial air distance between the third lens unit and the fourth lens unit at the telephoto end, and B4 is an axial air distance between the fourth lens unit and the fifth lens unit at the telephoto end.

6. The zoom lens according to claim 1, wherein the following condition is satisfied:

$0.30 < \beta 4T \cdot \beta 5T < 0.90$, where $\beta 4T$ is a lateral magnification of the fourth lens unit, and $\beta 5T$ is a lateral magnification of the fifth lens unit, both at the telephoto end.

7. The zoom lens according to claim 1, wherein the following condition is satisfied:

$-0.30 < f2/f1 < -0.10$, where f1 is a focal length of the first lens unit, and f2 is a focal length of the second lens unit.

8. The zoom lens according to claim 1, wherein the following condition is satisfied:

$0.40 < f3/f5 < 0.80$, where f3 is a focal length of the third lens unit, and f5 is a focal length of the fifth lens unit.

9. The zoom lens according to claim 1, wherein the first to fifth lens units move to the object side during zooming from the wide-angle end to the telephoto end.

10. The zoom lens according to claim 1, wherein the negative lens of the fourth lens unit has a biconcave shape.

11. The zoom lens according to claim 1, wherein the zoom lens forms an image on a solid-state image pickup element.

12. An image pickup apparatus comprising:
the zoom lens according to claim 1; and
a solid-state image pickup element configured to receive an image formed by the zoom lens.

* * * * *